(12) United States Patent
Geiger et al.

(10) Patent No.: US 12,508,096 B2
(45) Date of Patent: Dec. 30, 2025

(54) SYSTEMS AND METHODS FOR TISSUE EXPANSION

(71) Applicant: TIGER AESTHETICS MEDICAL, LLC, Conshohocken, PA (US)

(72) Inventors: Steven Charles Geiger, Hamilton, MT (US); Dan Carlisle, Santa Barbara, CA (US); Tom McClellan, Santa Barbara, CA (US)

(73) Assignee: TIGER AESTHETICS MEDICAL, LLC, Conshohocken, PA (US)

(*) Notice: Subject to any disclaimer, the term of this patent is extended or adjusted under 35 U.S.C. 154(b) by 950 days.

(21) Appl. No.: 17/508,508

(22) Filed: Oct. 22, 2021

(65) Prior Publication Data

US 2022/0125544 A1 Apr. 28, 2022

Related U.S. Application Data

(60) Provisional application No. 63/104,331, filed on Oct. 22, 2020.

(51) Int. Cl.
*A61F 2/12* (2006.01)
*A61B 90/00* (2016.01)
(Continued)

(52) U.S. Cl.
CPC ............... *A61B 90/02* (2016.02); *A61F 2/12* (2013.01); *A61M 29/02* (2013.01); *A61M 39/0208* (2013.01); *A61B 2090/3958* (2016.02); *A61M 2039/0205* (2013.01); *A61M 2039/0238* (2013.01)

(58) Field of Classification Search
CPC .................. A61F 2/12; A61F 2210/009; A61F 2250/0003; A61M 39/0208; A61M 2039/0205
See application file for complete search history.

(56) References Cited

U.S. PATENT DOCUMENTS

| 4,222,374 A | 9/1980 | Sampson et al. |
| 4,286,584 A | 9/1981 | Sampson et al. |

(Continued)

FOREIGN PATENT DOCUMENTS

| AU | 2021104178 A4 | 9/2021 |
| BR | 112020014324 A2 | 12/2020 |

(Continued)

OTHER PUBLICATIONS

Hawkin et al., "MRI Safety Information", Zimmer Biomet, http://www.zimmerbiomet.com/medical-professionals/support/rnri.html, accessed Feb. 8, 2018, 3 pages.

(Continued)

*Primary Examiner* — Bruce E Snow
(74) *Attorney, Agent, or Firm* — Blank Rome LLP

(57) ABSTRACT

A tissue expander comprising: a port assembly including a drain port and a fill port, a magnet housing assembly fitted to the port assembly, the magnet housing assembly including a single magnet having a magnetic field that is detectable on an exterior surface of a biological tissue of a patient; a shell defining the interior cavity of the tissue expander; and a drain assembly in fluidic communication with the drain port via the drain tubing.

28 Claims, 16 Drawing Sheets

(51) Int. Cl.
    *A61M 29/02* (2006.01)
    *A61M 39/02* (2006.01)

(56) References Cited

U.S. PATENT DOCUMENTS

| | | | |
|---|---|---|---|
| 4,671,255 A | 6/1987 | Dubrul et al. |
| 4,800,901 A | 1/1989 | Rosenberg |
| 5,630,843 A | 5/1997 | Rosenberg |
| 5,758,667 A | 6/1998 | Slettenmark |
| 5,879,297 A | 3/1999 | Haynor et al. |
| 5,882,353 A | 3/1999 | VanBeek et al. |
| 5,944,023 A | 8/1999 | Johnson et al. |
| 6,044,297 A | 3/2000 | Sheldon et al. |
| 6,206,930 B1 | 3/2001 | Burg et al. |
| 7,255,682 B1 | 8/2007 | Bartol, Jr. et al. |
| 7,575,597 B2 | 8/2009 | Rehnke |
| 7,608,038 B2 | 10/2009 | Ginsberg |
| 7,736,391 B2 | 6/2010 | Schwibner et al. |
| 7,794,451 B1 | 9/2010 | Chuter et al. |
| 7,871,438 B2 | 1/2011 | Corbitt, Jr. et al. |
| 8,015,977 B2 | 9/2011 | Bertrand et al. |
| 8,171,938 B2 | 5/2012 | Bengtson |
| 8,381,817 B2 | 2/2013 | Schultz et al. |
| 8,453,745 B2 | 6/2013 | Schultz et al. |
| 8,454,690 B2 | 6/2013 | Mcclellan |
| 8,816,806 B2 | 8/2014 | Tait et al. |
| 9,072,895 B2 | 7/2015 | Mate et al. |
| 9,232,977 B1 | 1/2016 | Rehman et al. |
| 9,268,915 B2 | 2/2016 | Holmes et al. |
| 9,333,071 B2 | 5/2016 | Boyden et al. |
| 9,696,752 B2 | 7/2017 | Stryker |
| 9,764,124 B2 | 9/2017 | Tallarida et al. |
| 9,788,838 B2 | 10/2017 | Mcclellan et al. |
| 9,814,566 B1 | 11/2017 | Cree |
| 10,010,404 B2 | 7/2018 | Mcclellan |
| 10,252,145 B2 | 4/2019 | Tran et al. |
| 10,264,995 B2 | 4/2019 | Brister et al. |
| 10,709,851 B2 | 7/2020 | Geiger |
| 10,751,165 B2 | 8/2020 | Feinberg et al. |
| 11,039,898 B2 | 6/2021 | Mcclellan |
| 11,259,891 B2 | 3/2022 | Girgenti et al. |
| 11,537,829 B2 | 12/2022 | Geissler et al. |
| 11,571,271 B2 | 2/2023 | Martinez et al. |
| 12,011,578 B2 * | 6/2024 | Geiger .............. A61M 39/0208 |
| 2004/0064030 A1 | 4/2004 | Forsell |
| 2005/0061198 A1 | 3/2005 | Khan et al. |
| 2006/0224129 A1 | 10/2006 | Beasley et al. |
| 2007/0233273 A1 | 10/2007 | Connell |
| 2007/0288095 A1 | 12/2007 | Wirtel et al. |
| 2008/0033471 A1 | 2/2008 | Paz et al. |
| 2008/0091175 A1 | 4/2008 | Frikart et al. |
| 2008/0161929 A1 | 7/2008 | McCormack et al. |
| 2008/0288068 A1 | 11/2008 | Kronowitz |
| 2009/0012372 A1 | 1/2009 | Burnett et al. |
| 2009/0157180 A1 | 6/2009 | Schraga |
| 2010/0256775 A1 | 10/2010 | Belhe et al. |
| 2011/0152913 A1 | 6/2011 | Jones et al. |
| 2011/0153017 A1 | 6/2011 | Mcclellan |
| 2011/0208311 A1 | 8/2011 | Janowski |
| 2011/0264104 A1 | 10/2011 | Naoum |
| 2012/0041305 A1 | 2/2012 | Grissom et al. |
| 2012/0165657 A1 | 6/2012 | Groszmann et al. |
| 2012/0184893 A1 | 7/2012 | Thompson et al. |
| 2012/0302874 A1 | 11/2012 | Hollstien |
| 2013/0116664 A1 | 5/2013 | Tai et al. |
| 2013/0190796 A1 | 7/2013 | Tilson et al. |
| 2013/0338769 A1 | 12/2013 | Boyden et al. |
| 2014/0121771 A1 | 5/2014 | Chitre et al. |
| 2015/0238118 A1 | 8/2015 | Legassey et al. |
| 2015/0327985 A1 | 11/2015 | Hristov et al. |
| 2015/0374906 A1 | 12/2015 | Forsell |
| 2016/0066979 A1 | 3/2016 | Mueller et al. |
| 2016/0250017 A1 | 9/2016 | Mcclellan |
| 2016/0284497 A1 | 9/2016 | Stryker |
| 2016/0310306 A1 | 10/2016 | Brister et al. |
| 2016/0374720 A1 | 12/2016 | Anderson et al. |
| 2017/0226627 A1 | 8/2017 | Jin et al. |
| 2017/0228627 A1 | 8/2017 | Geissler et al. |
| 2017/0246019 A1 | 8/2017 | Miesse et al. |
| 2018/0092736 A1 | 4/2018 | Lee et al. |
| 2018/0116779 A1 | 5/2018 | Marx |
| 2018/0116823 A1 | 5/2018 | Johannaber et al. |
| 2018/0289929 A1 | 10/2018 | Ma et al. |
| 2019/0000656 A1 | 1/2019 | Pool et al. |
| 2019/0025040 A1 | 1/2019 | Andreason et al. |
| 2019/0142574 A1 | 5/2019 | Quiros et al. |
| 2019/0175334 A1 | 6/2019 | Van Heugten et al. |
| 2019/0192044 A1 | 6/2019 | Ravi et al. |
| 2019/0192326 A1 | 6/2019 | Chen et al. |
| 2019/0239976 A1 | 8/2019 | McClellan |
| 2019/0269466 A1 | 9/2019 | King et al. |
| 2019/0282756 A1 | 9/2019 | Hanson et al. |
| 2019/0365277 A1 | 12/2019 | Brister et al. |
| 2020/0008923 A1 | 1/2020 | Geiger et al. |
| 2020/0078158 A1 | 3/2020 | Popescu |
| 2020/0129258 A1 | 4/2020 | Feinberg et al. |
| 2020/0129259 A1 | 4/2020 | Feinberg |
| 2020/0268965 A1 | 8/2020 | Loudermilk et al. |
| 2020/0276397 A1 | 9/2020 | Geiger |
| 2022/0062586 A1 | 3/2022 | Urry |
| 2022/0125544 A1 | 4/2022 | Geiger et al. |
| 2022/0143380 A1 | 5/2022 | Geiger |
| 2024/0278006 A1 | 8/2024 | Tan et al. |
| 2025/0121171 A1 * | 4/2025 | Hoffman .......... A61M 39/0208 |

FOREIGN PATENT DOCUMENTS

| | | |
|---|---|---|
| BR | 112021004402 A2 | 7/2021 |
| BR | 112018074743 B1 | 1/2024 |
| CA | 3196591 A1 | 4/2022 |
| CN | 105112855 A | 12/2015 |
| CN | 211061074 U | 7/2020 |
| CN | 213100088 U | 5/2021 |
| CN | 113244531 A | 8/2021 |
| CN | 114114092 A | 3/2022 |
| EP | 0619101 A1 | 10/1994 |
| EP | 2062530 A3 | 8/2009 |
| EP | 3556317 A1 | 10/2019 |
| ES | 2554783 T3 | 12/2015 |
| ES | 2836799 T3 | 6/2021 |
| ES | 2908305 T3 | 4/2022 |
| ES | 1305863 U | 2/2024 |
| JP | 2010185529 A | 8/2010 |
| JP | 2019069203 A | 5/2019 |
| JP | 7530458 B2 | 8/2024 |
| KR | 102479359 A | 7/2019 |
| WO | 2007021776 A2 | 2/2007 |
| WO | 2011063349 A1 | 5/2011 |
| WO | 2011075731 A2 | 6/2011 |
| WO | 2011087788 A2 | 7/2011 |
| WO | 2014158772 A1 | 10/2014 |
| WO | 2015058051 A1 | 4/2015 |
| WO | 2017/210020 A1 | 12/2017 |
| WO | 2017210085 A1 | 12/2017 |
| WO | 2018078446 A1 | 5/2018 |
| WO | 2019/147857 A1 | 8/2019 |
| WO | 2019245241 A1 | 12/2019 |
| WO | 2020/052940 A1 | 3/2020 |
| WO | 2020089773 A1 | 5/2020 |
| WO | 2022018607 A2 | 1/2022 |
| ZA | 202105012 B | 8/2021 |

OTHER PUBLICATIONS

Shen et al., 2008 Effects of sensor orientation on AC electromagnetic tracking system accuracy in a CT scanner environment.
An International Search Report & Written Opinion issued by the International Search Authority on Feb. 14, 2022 in connection PCT/US2021/056252.

(56) References Cited

OTHER PUBLICATIONS

Catalog: Sientra, Dual magnetic port locator instructions for use, Sep. 25, 2020: https://sientra.com/app/uploads.2020/08/Directions-for-use-Dual-Magnetic-Port-Locator.pdf.

* cited by examiner

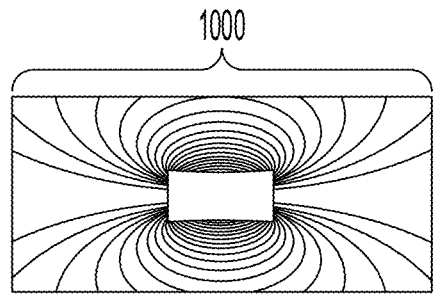

FIG. 10

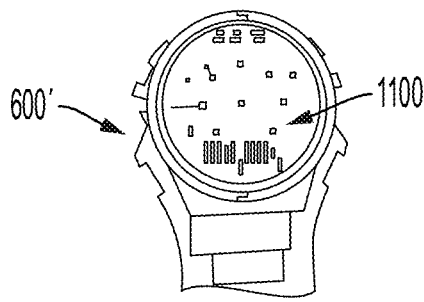

FIG. 11

```
┌─────────────────────────────────────────────────────────────┐
│ place/hover digital port locator around the surface of an   │─ 1202
│ avascular tissue of a patient within which is implanted a   │
│ tissue expander                                             │
└─────────────────────────────────────────────────────────────┘
                              │
                              ▼
┌─────────────────────────────────────────────────────────────┐
│ detect magnetic field of single magnet within magnetic      │─ 1204
│ housing assembly of tissue expander configured to house     │
│ the single magnet                                           │
└─────────────────────────────────────────────────────────────┘
                              │
                              ▼
┌─────────────────────────────────────────────────────────────┐
│ responsive to analyzing the magnetic field, determining the │─ 1206
│ location of the fill and drain ports of the tissue expander │
│ based on the analysis by directionally indicating the       │
│ location of the fill and drain ports                        │
└─────────────────────────────────────────────────────────────┘
```

FIG. 12

SYSTEMS AND METHODS FOR TISSUE EXPANSION

CROSS-REFERENCE TO RELATED APPLICATIONS

This application claims the benefit of U.S. Provisional Patent Application No. 63/104,331 filed Oct. 22, 2020, which is incorporated by reference herein in its entirety.

BACKGROUND

Tissue expanders are commonly used in connection with breast reconstruction. After surgery, a tissue expander is implanted into the breast cavity in order to maintain or increase the skin envelope around the tissue expander. The tissue expander is eventually removed in favor of a more permanent implant.

U.S. Pat. No. 8,454,690 describes a tissue expander that includes a pair of ports—a first port for delivery of fluid to a space within the tissue expander to selectively add fluid and expand the tissue expander, and a second port to treat the space surrounding the tissue expander through an integral drain system that permits fluid aspiration.

Tissue expanders, such as the one described in U.S. Pat. No. 8,454,690, are currently constructed to include a significant amount of metal in the form of magnets that are co-located with the ports in order for a surgeon to be able to locate the ports to facilitate fluid delivery or aspiration. The ports themselves are also formed of metal. Use of large amounts of metal in a tissue expander may interfere with radiation therapy and/or the use of magnetic resonance imaging (MRI) technology on patients having such tissue expanders. More specifically, use of metals in tissue expanders may affect dose calculations associated with a radiation therapy as well as undesirable interactions of organic tissue around the tissue expander with radiation during the radiation therapy. The size and strength of a magnet within a tissue expander can also interfere with the magnetic field generated by MRI machines thereby introducing noise into MM data captured around the tissue expander. Accordingly, it is desired to reduce the amount of metal, magnet size, and magnet strength used in tissue expanders in order to permit use of radiation therapy and/or MM procedures on a patient having such tissue expanders.

This disclosure also provides tissue expander embodiments that allow for easier detection of metallic and/or nonmetallic fill and/or drain ports. Such tissue expander embodiments have an added benefit of being produced at significantly lower costs.

Moreover, having tissue expander configurations that allow for quick identification of relevant ports (e.g., fluid delivery and/or fluid drain ports) is very much desired as this optimizes procedures associated with breast reconstruction.

SUMMARY

The present disclosure relates to an improved tissue expander that includes location magnets that are decoupled from the fluid delivery or aspiration ports. By decoupling the magnets from the ports, the magnets may be located closer to the surface of the tissue expander, and thus need not be as strong as prior art magnets. By being able to utilize magnets of reduced strength, the magnets may be smaller in size, thus reducing mass and surface area. Further, because the magnets are decoupled from the ports, the internal port depth will be greater in the tissue expander, thus allowing for full delivery apparatuses (e.g., syringe and needle combo) to be used to deliver fluid to and/or retrieve fluid from the tissue expander as needed. In addition, a larger diameter apparatus (e.g. needle with gauge size of 18) can be used to speed up the fluid delivery and/or fluid extraction process as more fluid can be pumped. The ports may also be constructed of non-metal components, such as polyether ether ketone (PEEK) materials and/or other polymers, thereby further reducing the amount of metal in the tissue expander.

An improved port locator is also described. The port locator is designed to work with the decoupled magnet or magnets such that the decoupled magnet or magnets attract the port locator to sit flush against biological tissue within which the tissue expander has been embedded and thereby cause at least two apertures of the port locator to align with the ports of the tissue expander. A practitioner may then access the ports of the tissue expander via the two apertures. In some cases, the port locator may be used in conjunction with a single magnet decoupled from a single port of the tissue expander. In such instances, the decoupled single magnet within the tissue expander attracts a magnet within the port locator which subsequently sits flush against the biological tissue to identify the single port of the tissue expander.

An improved drain is also described. The improved drain has a reduced cross-sectional area, which makes the drain and overall tissue expander more pliable.

BRIEF DESCRIPTION OF THE DRAWINGS

FIG. 10 shows an exemplary magnetic field of a magnet placed within the magnet housing assembly of the tissue expander.

FIG. 11 shows an exemplary digital port locator used to identify the fill port and a drain port of the tissue expander that has been implanted into a patient's biological tissue.

FIG. 12 shows an exemplary flow chart for using the digital port locator to locate a fill and a drain port of the tissue expander.

DETAILED DESCRIPTION

Tissue Expander

In breast cancer treatment, breasts with malignant cancer tumors are sometimes surgically removed through a procedure called mastectomy. A patient who has had a mastectomy may further undergo breast reconstruction with immediate placement of the tissue expander underneath the patient's tissue (e.g., skin tissue or avascular tissue) where the breast was removed in order to stretch said tissue and/or maintain an existing tissue pocket to accommodate a breast implant in the future. In some cases, the placement of the tissue expander underneath the patient's tissue may be delayed for some time after the mastectomy. After some time, the patient may build up fluid (e.g., seromas including dead skin) within the tissue pocket around the tissue expander as part of the healing process. The present disclosure presents a tissue expander with improved features that allows for efficient extraction of fluid, disinfecting infections associated with seromas, filling/aspirating of the tissue expander, seamlessly identifying ports for such procedures, and enabling patients with tissue expanders to undergo treatments such as radiation therapies and or MRI without needing to remove an implanted tissue expander.

Figure 1A:
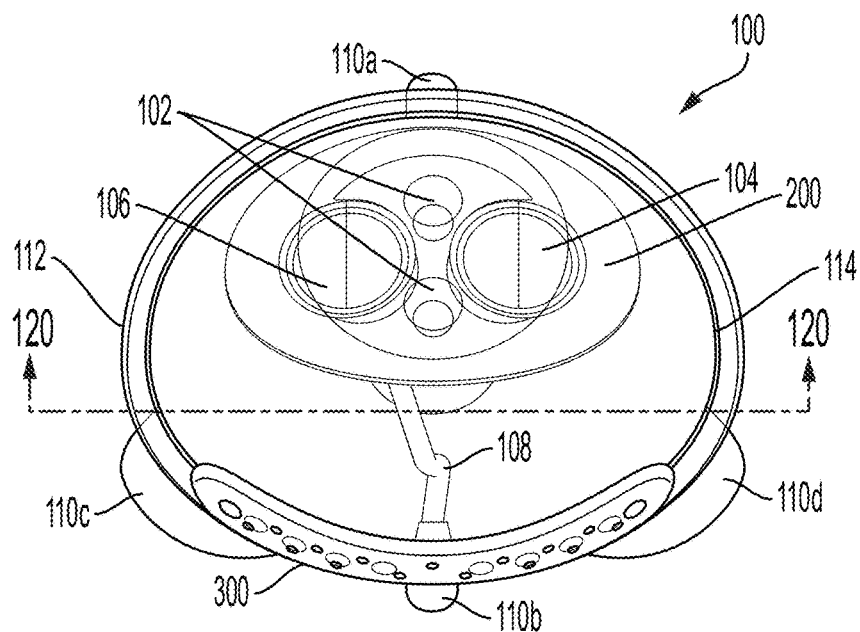
FIG. 1A shows an exemplary tissue expander.

FIG. 1A shows a tissue expander 100 according to one embodiment of this disclosure. The tissue expander may include a magnet housing assembly 102, a fill port 104, a drain port 106, a drain tubing 108, and one or more suture tabs 110a-110d. The tissue expander 100 also includes a skirt/port assembly 200 within which is located the magnet housing assembly 102 and the fill and drain ports 104 and 106, respectively. Operationally, a shell 112 of the tissue expander 100 defines an interior cavity 114 that receives fluid (e.g., saline solution, water, air, etc.) to enlarge the shell 112 and thereby causes expansion of a patient's biological tissue (e.g. breast/skin tissue) surrounding the tissue expander 100. Suture tabs 110a-110d secure the tissue expander 100 in place so that it does not move around within the avascular tissue pocket of the patient. According to one embodiment, the suture tabs 110a-110d may be positioned to have a lengthwise centerline that is perpendicular to a base perimeter tangent of the shell 112. This allows the suture tabs 110a-110d to have stretch reinforcement properties that desirably prevent the tissue expander 100 from being dislodged after placement within the avascular tissue pocket of the patient due to stretches and/or other movements of the tissue expander 100.

Figure 1B:
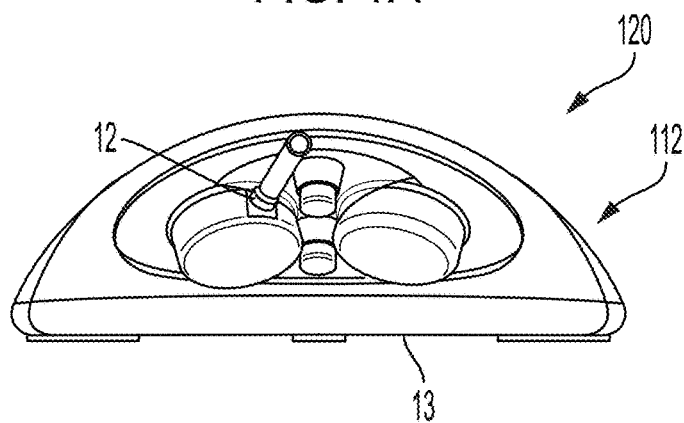
FIG. 1B shows a sectional view of the tissue expander.
Figure 1C:
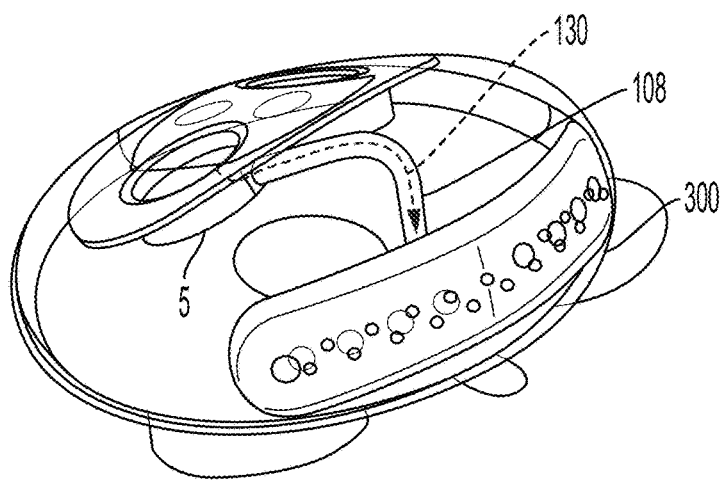
FIG. 1C shows a flow path of fluid that is supplied into the drain port of the tissue expander.

The sectional view 120 (FIG. 1B) of the tissue expander 100 shows a coupling of the tubing junction 12 (see FIG. 2) to the drain tubing 108 (see FIG. 1). In one embodiment, this coupling may be further enhanced using an adhesive. The perspective view of the tissue expander 100 in FIG. 1C shows a flow path 130 of a fluid (e.g., antibiotic) that is supplied (e.g., injected) into the drain port 106. As will be further discussed in relation to FIG. 2, fluid first travels through the drain cup 5 and then through the drain tubing 108 via the flow path 130 before arriving at the drain assembly 300 (see FIG. 1C).

Figure 2:
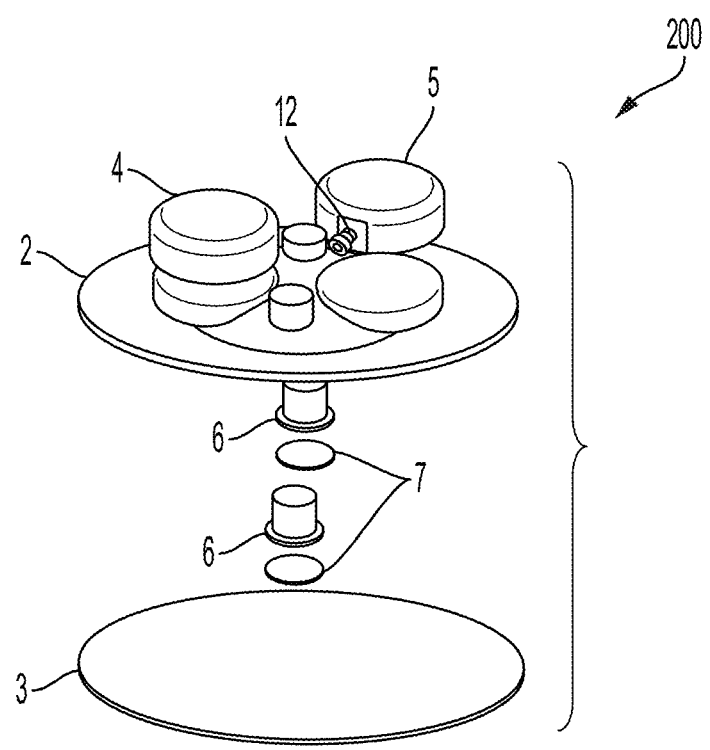
FIG. 2 shows an exploded view of a skirt/port assembly of the tissue expander.

The exploded view of the skirt assembly 200 of FIG. 2 shows a skirt assembly 200 which accommodates the positioning of components of the fill and drain ports 104 and 106 as well as the magnet housing assembly 102. The skirt assembly 200 includes a fill port cup 4 associated with the fill port 104 and a drain port cup 5 (also shown in FIG. 1C) associated with the drain port 106. According to one implementation, fluid (e.g., saline solution, water, air, etc.) may be delivered to and/or extracted out of the interior cavity 114 of the tissue expander 100 through the fill port cup 4. This fluid is what causes the tissue expander to expand and/or contract depending on the amount of fluid in the interior cavity of the tissue expander 100. Further, the drain port cup 5 is in fluidic communication with the drain assembly 300 (see FIG. 1A) via the drain tubing 108. The fill port cup 4 and the drain port cup 5 sit on a skirt 2 of the skirt assembly 200. According to some implementations, the fill port cup 4 may be configured to regulate fluid flow (e.g., flow of saline solution) into the interior cavity 114 of the tissue expander. Similarly, the drain port cup 5 may be configured to regulate fluid flow from the drain assembly 300 (e.g., seroma fluid in the breast pocket) of the tissue expander 100, or to regulate fluid flow to the drain assembly 300 (e.g., flow of antibiotics) of the tissue expander 100.

At least one groove may be fabricated into the skirt 2 such that the magnet housing assemblies 6 (shown in FIG. 1A as magnet housing assembly 102) may be housed within the at least one groove. According to one embodiment, each magnet housing assembly 6 may have a magnet fitted within it to guide a practitioner (e.g., surgeon, nurse, doctor, etc.) to readily locate the fill port 104 and the drain port 106 as discussed below in association with FIG. 4.

As can be appreciated, placing the magnets in the magnet housing assemblies 6 effectively decouples the magnets from the fill port 104 and the drain port 106. This beneficially allows the miniaturization of magnets for the tissue expander 100 without affecting optimal design considerations for the fill and drain ports 104 and 106, respectively. For example, the fill port cup 4 and the drain port cup 5 may have larger inlet surface areas relative to the surface areas of magnets within the magnet housing assemblies 6. For example, the surface area of the magnet within each magnet housing assembly 6 may be: between about 0.01-0.1 times the inlet surface area of the fill port or drain port cups 4 and 5, respectively; or between 0.1-0.2 times the inlet surface area of the fill port or drain port cups 4 and 5, respectively; or between 0.2-0.3 times the inlet surface area of the fill port or drain port cups 4 and 5, respectively; or between 0.3-0.4 times the inlet surface area of the fill port or drain port cups 4 and 5, respectively. In some cases, the magnets used in the tissue expander 100 and/or the port locator 600 have a strength between about 700-1200 gauss. In addition, the magnets described in the present disclosure have a significantly smaller diameter relative to magnets used in prior art tissue expander systems. In some embodiments, the diameter of the magnets in the present disclosure are over 50% smaller in diameter relative to prior art magnets. Indeed, magnets having a diameter of about ½ of an inch and smaller relative to prior art magnets are contemplated. The reduced size of the magnets described in this disclosure results in magnets having much less mass relative to prior art magnets.

It should be noted that the various components of the tissue expander except for the magnets in the magnet housing assemblies 6 are non-metallic according to some implementations. For example, whereas prior art tissue expanders utilized titanium ports, the present disclosure contemplates use of a polymer, such as PEEK material, for the ports, thus further reducing the amount of metal within the tissue expander.

As a result of the decoupling of the magnets from the ports, and the removal of metal ports, there is an overall reduced amount of metal in the tissue expander, thus permitting patients having such tissue expanders to be able to undergo medical procedures (e.g., radiation therapy) and/or other procedures involving magnetic resonance imaging (MRI). Indeed, it is possible to achieve MRI-conditional status through the use of smaller magnets. To reiterate, decoupling the magnets used in the tissue expander 100 from the fill port 104 and/or the drain port 106 allows for the use of small magnets within the tissue expander 100 without sacrificing design considerations such as optimal fill port cup 4 and drain port cup 5 inlet sizes.

Turning back to FIG. 2, the skirt assembly 200 also includes magnetic spacer discs 7 which provide magnetic insulation for the magnets within the magnet housing assemblies 6. A skirt attachment layer 3 of the skirt assembly 200 has an upper surface attached to a bottom surface of the skirt 2. It is appreciated that the tubing junction 12 of the drain port cup 5 may fluidly couple the drain tubing 108 (see FIG. 1A) to the drain assembly 300 (see FIG. 1A). In such embodiments, the drain tubing 108 may be positioned between the inner surface of the shell 112 and the exterior surface of the interior cavity 114 (see FIG. 1A). In one embodiment, the drain tubing 108 is attached to the inner surface of the shell 112. In other embodiments, the drain tubing 108 is attached to the exterior surface of the interior cavity 114. The drain tubing 108 may also be configured to freely pass through the space between the inner surface of the shell 112 and the exterior surface of the interior cavity 114 according to some embodiments. Configurations where the drain tubing 108 passes through interior sections of the interior cavity 114 to join the drain assembly 300 are also contemplated herein.

Figure 3A:
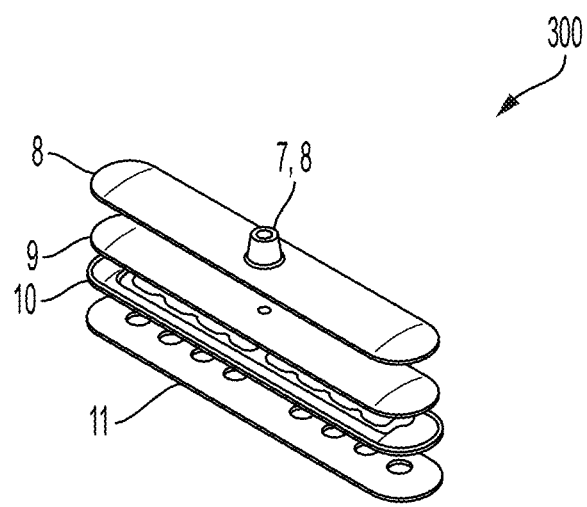
FIG. 3A shows an exploded view of a drain assembly of the tissue expander.

FIG. 3A shows an exploded view of a drain assembly 300 according to one embodiment of this disclosure. The drain assembly 300 may include a drain backing layer 8, a drain backing attachment layer 9, a drain manifold 10, and a drain manifold attachment layer 11. The drain backing layer includes a drain hole 7 whose inlet is configured to mate with the drain tubing 108 (see FIG. 1A). The drain hole 7, according to a preferred embodiment, is not occluded by any part of the drain assembly 300. The attachment layers 9 and 11 are configured, according to some embodiments, to have similar hole dimensions as the hole dimensions of the drain manifold 10. It is appreciated that the drain assemblies discussed in association with various tissue expander embodiments provided in this disclosure may be located around a lower portion of the shell of the tissue expander, and/or located around an upper portion of the tissue expander, and/or located around multiple portions of the shell of the tissue expander. It is further appreciated that the various embodiments of the disclosed tissue expander may include multiple drain assemblies as needed.

According to some implementations, components of the drain assembly 300 may be optimized for fluid delivery and/or fluid extraction. For example, the drain backing layer 8, the drain backing attachment layer 9, the drain manifold 10, and the drain manifold attachment layer 11 of FIG. 3A may be built into or otherwise embedded within the shell 112 of the tissue expander 100 such that the seams of the drain backing layer 8, the drain backing attachment layer 9, the drain manifold 10, and the drain manifold attachment layer 11 are tapered and domed at both ends to reduce the cross-sectional area of the drain. This in turn makes the drain more pliable to expand and/or contract with the shell 112 based on fluid (e.g., saline solution, gas, or water) within the interior cavity 114 of the tissue expander.

Figure 3B:
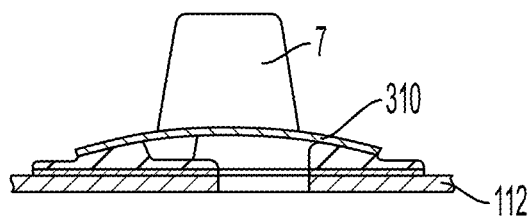
FIGS. 3B and 3C show cutaway views of embodiments of a drain hole of the drain assembly.
Figure 3C:
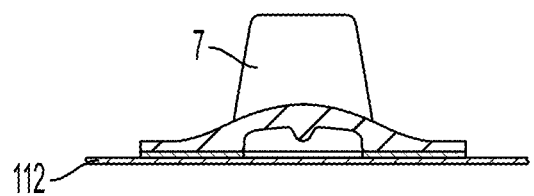

FIGS. 3B and 3C show cutaway views of embodiments of the drain hole 7 of the drain assembly 300. FIG. 3B illustrates a two-piece structure including a spacer layer 310, whereas FIG. 3C illustrates an embodiment where the spacer layer has been removed, thus resulting in a one-piece component. The drain assembly embodiment of FIG. 3C is particularly advantageous as removal of the spacer layer also removes the need for an adhesive layer associated with the spacer layer. As such, the one-piece embodiment of FIG. 3C achieves further desired pliability. In both embodiments, the drain hole 7 may be placed on a mandrel of a mold before dipping it in Polytetrafluoroethylene (PTFE) to infuse the drain hole 7 with non-stick coating properties that prevent fluid and/or other substances (e.g., impurities) from sticking to the drain hole 7. It is appreciated that other components of the tissue expander 100 may also be coated with PTFE to enhance their non-stick properties. For example, the drain manifold attachment layer 11, the drain backing layer 8, and the drain tubing 108 may also be coated with PTFE.

In some instances, one or more of the drain assembly components are directly integrated into the shell 112 of the tissue expander 100 such that the drain hole 7 of FIGS. 3B and/or 3C may merely be slid into or otherwise attached to a receptacle on the inner surface of the shell 112 where the drain assembly components have been integrated. As previously noted, multiple drain assemblies may be present at specific locations of the various disclosed embodiments of the tissue expander and/or located around multiple locations around the shell of the various disclosed embodiments of the tissue expander as the case may require. In some instances, each drain assembly of the tissue expander may be individually integrated into a shell receptacle coupled to the shell of the tissue expander. In some embodiments, each drain assembly may be coupled to a single shell receptacle such that the single shell receptacle collects and/or receives fluid from one or more drain assemblies of the tissue expander and/or delivers fluid (e.g., antibiotic/disinfectant fluid, liquid medicine, etc.) to one or more drain assemblies of the tissue expander.

Port Locator

Figure 4:
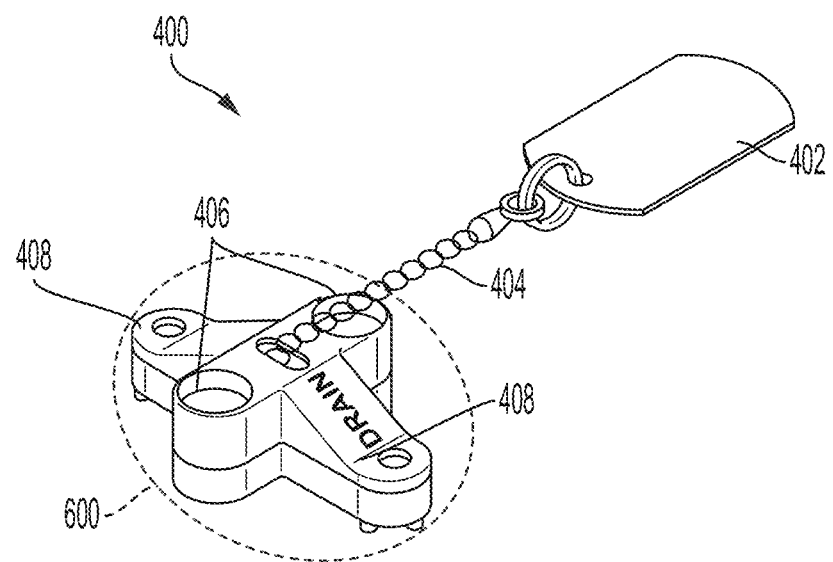
FIG. 4 shows a port locator assembly which may be used to identify a fill port and a drain port of the tissue expander that has been implanted into a patient's biological tissue.

FIG. 4 shows a port locator assembly 400 which may be used to readily identify the fill port 104 and a drain port 106 of a tissue expander 100 that has been implanted into a patient's biological tissue. The port locator assembly 400 may include a tag 402 and a chain 404. The port locator assembly 400 also includes magnet locations 406 and locator apertures 408 within a port locator 600. The tag 402 may have identifier information (e.g., model number, model name, etc.) of the tissue expander 100 to help a practitioner (e.g., surgeon, nurse, etc.) readily match the tissue expander 100 to an appropriate tag 402. The port locator may also have markings such as "fill" and "drain" to correspond the locator apertures to the particular fill and drain ports in the tissue expander.

The chain 404 (e.g., ball chain) attaches the tag 402 to the port locator 600. In one embodiment, the tag 402 provides a mechanism that a practitioner can hold to hover the port locator 600 over an area on the exterior surface of the patient's tissue (e.g., avascular tissue such as breast tissue) within which is implanted a tissue expander 100. For example, when the practitioner holds the tag 402 connected to a ball chain that couples the port locator 600 to the tag 402 and moves it across an area on the surface of the patient's tissue where the tissue expander 100 has been implanted, the port locator 600 freely moves or rotates in response to the magnetic interactions between the port locator 600 and the tissue expander 100 until the magnets within the tissue expander 100 attract the magnets within the port locator 600. This magnetic attraction causes the port locator 600 to stably sit in a specific position on the exterior surface of the patient's tissue. In this position, locator apertures 408 align with the fill and drain ports 104 and 106 of the tissue expander 100. It is appreciated that each magnet location 406 may house a magnet such that the bottom portions of both magnets within each magnet location 406 are oriented to have opposite polarities (e.g., North, South) that correspond to upward facing and oppositely oriented magnets (e.g., South, North) within the magnet housing assembly 102 of the tissue expander 100.

Figure 5:
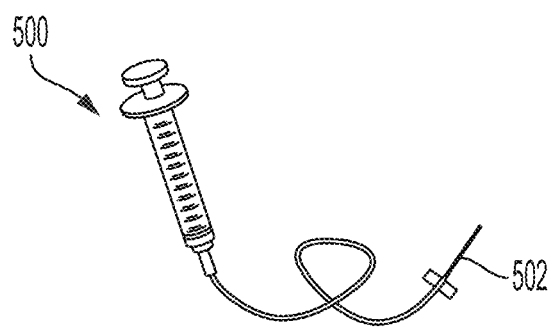
FIG. 5 shows a delivery apparatus used to deliver fluid to or extract fluid from the tissue expander.

In one embodiment, when the opposite polarities of the magnet or magnets within the magnet locations 406 of the port locator 600 align with the oppositely oriented magnet or magnets within the magnet housing assembly 102 of the tissue expander 100, the locator apertures 408 align with the fill port 104 and the drain port 106 so that a delivery apparatus 500 (see FIG. 5) may be used to deliver and/or extract fluid from the tissue expander 100. More specifically, because the tissue expander is implanted within the patient's biological tissue (e.g., avascular tissue such as breasts), the fill port 104, and the drain port 106 of the tissue expander 100 cannot be visibly identified by the practitioner since these ports are covered by portions of the patient's biological tissue. As such the disclosed tissue expander allows a practitioner to effortlessly identify the fill and drain ports of a tissue expander 100 using the port locator 600.

Subsequent to identifying the fill and drain ports of the tissue expander 100, the practitioner may percutaneously access or otherwise perforate, using the tip 502 of the delivery apparatus 500 (e.g., syringe and needle combo), the patient's tissue through locator apertures 408 to either administer and/or extract fluid as the case may be.

According to one implementation, the delivery apparatus is a syringe and needle combo with a needle size between about 15 gauge to 21 gauge, or possibly larger needles. In an exemplary embodiment, the needle is an 18 gauge needle that allows for rapid fluid delivery and/or fluid extraction from the tissue expander 100 via the fill port 104 and/or the drain port 106. For example, fluid buildup (e.g., seroma) within the patient's biological tissue around the tissue expander may include particles of dead skin. It is thus desirable to have a needle size that allows the practitioner to more efficiently extract not only the seroma fluid but also, extract the dead skin particles and thereby minimize the patient's exposure to infections. The disclosed tissue expander 100 allows for use of large needle sizes (e.g., 18 gauge or larger) to facilitate rapid extraction of seromas and dead skin via the drain port of the tissue expander 100. Antibiotics may also be delivered through the drain port of the tissue expander 100 to treat infections that may have arisen due to the seromas. Furthermore, the drain and fill ports, in some implementations, are configured to be deeper below the avascular tissue of the patient relative to the position of the magnets within the tissue expander 100. This is in part because the magnets within the magnet housing assembly 102 of the tissue expander 100 are decoupled from drain and fill ports 104 and 106, respectively. Consequently, decoupling the tissue expander's magnets from the ports effectively allows for the use of larger and deeper penetration point delivery devices (e.g., a syringe needle combo having a needle size of 18 gauges or more), thus allowing for faster fluid delivery and/or extraction. This advantage over prior art configurations allows for seamlessly and rapidly filling and/or aspirating of the tissue expander 100 which provides for greater patient comfort.

Figure 6:
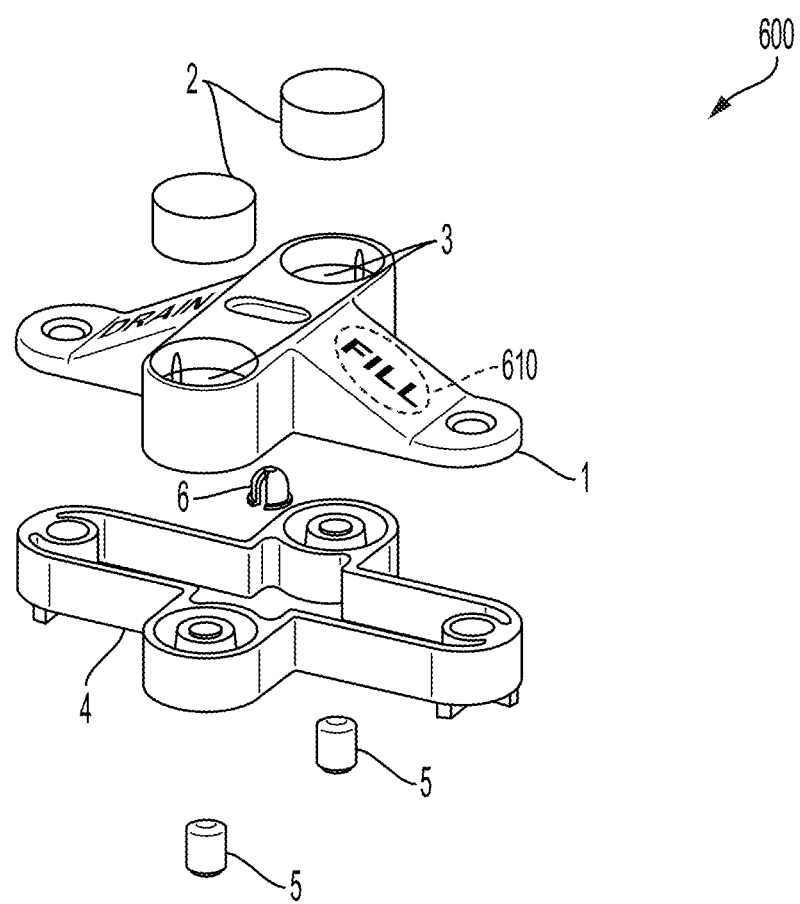
FIG. 6 shows an exploded view of the port locator associated with the tissue expander.

FIG. 6 shows an exploded view of a port locator 600 according to one embodiment of this disclosure. The port locator 600 may include a locator body 1, at least two magnets 2, magnet housing 3, locator spacer 4, setscrews 5, and stopper 6. The locator body 1 may be fastened to the locator spacer 4 using magnetic attraction between the setscrews 5 and the magnets 2. The magnet housing 3 is configured to hold or otherwise house the magnets 2 while the stopper 6 effectively secures the chain 404 in place thus attaching the port locator 600 to the tag 402. The magnet housing 3 (as well as the magnet housing assembly 102 of FIG. 1) ensure that the magnets 2 are shielded from undue external interference. In a preferred embodiment, the locator body 1 may include textual (e.g., labeling, etc.) and/or graphical (e.g., markings) identifiers 610 that are located around/near the locator apertures 408 (see FIG. 4) to better inform the practitioner of the relevant ports underneath the patient's tissue after appropriately aligning magnets of the port locator 600 with the magnets within the tissue expander 100.

As can be seen in FIGS. 4 and 6, the locations of the locator apertures 408 are separate from the locations of the magnet housing 3 illustrating the effective decoupling of the magnets 2 from the fill and drain ports of the tissue expander 100. In one embodiment, the locator apertures 408 are parallel to each other just as the locations of the magnet housings 3 are parallel to each other. As such an imaginary centerline segment through the locator apertures 408 and another imaginary centerline segment through the locations of the magnet housing 3 would intersect to form a 90-degree angle. Other embodiments where the intersecting angle is non-perpendicular are herein contemplated. It is appreciated that the positions of the magnets within the port locator 600 may be higher relative to the positions of the locator apertures 408.

Figure 7:
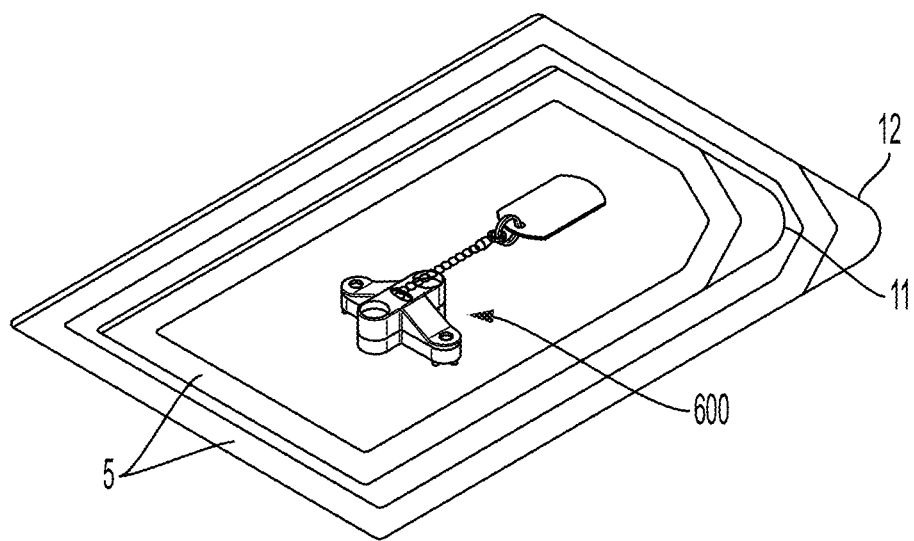
FIG. 7 shows a pouch within which the port locator may be stored.

In some embodiments, the port locator 600 may be placed within a primary pouch 11 as shown in FIG. 7. The primary pouch 11 may in turn be placed in a secondary pouch 12 which may further include one or more primary pouches 11 containing one or more port locators. In some instances, the primary pouch 11 effectively insulates the magnets within the port locator 600 from losing their magnetism and getting weaker. In other words the primary pouch 11 may be configured to house and thereby protect the port locator 600 from unwanted temperature changes, external charges, reluctance changes, and/or other conditions that adversely affect magnets while the port locator is not in use.

Method

Figure 8:
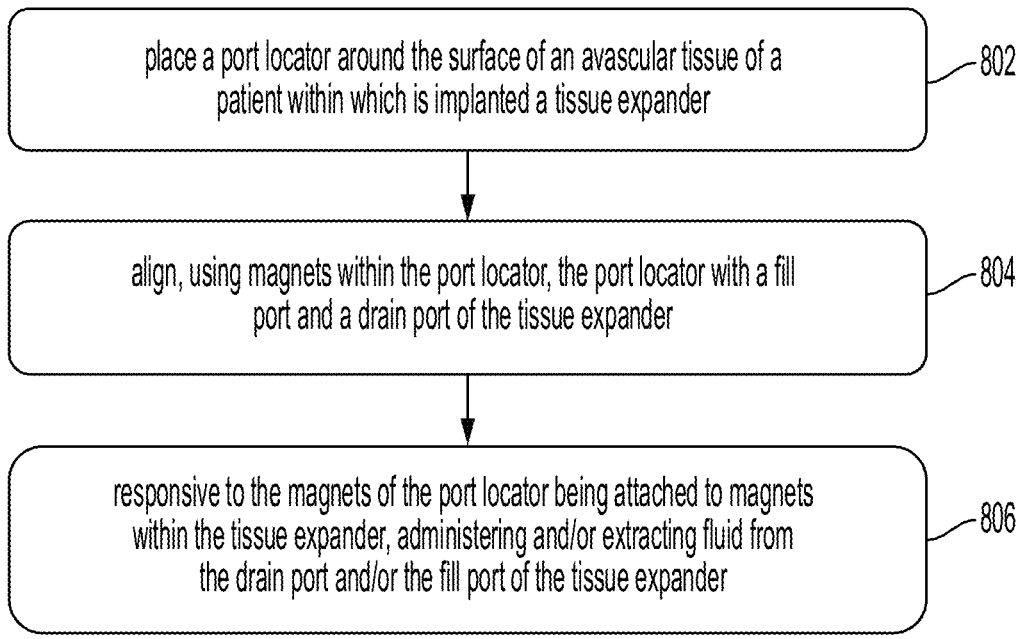
FIG. 8 shows an exemplary flowchart for locating a fill port and a drain port of the tissue expander.

FIG. 8 shows an example flowchart for locating a fill port and/or a drain port of a tissue expander 100. At block 802, a practitioner may place a port locator 600 around an exterior surface of a patient's tissue (e.g., avascular tissue such as breast tissue) within which is implanted a tissue expander 100. The practitioner may initially guide the port locator 600 on the exterior surface of the patient's tissue until the magnets within the port locator 600 attach to the magnets within the tissue expander 100. According to one embodiment, the practitioner guides the port locator 600 by holding the tag coupled to the port locator 600 and hovering the port locator over the exterior surface of the patient's tissue until the port locator 600 is attracted by the magnets within the tissue expander 100. For this attraction to happen, a magnet with a North polarity within the port locator 600 is attracted to a magnet with a South polarity within the tissue expander 100 while a magnet with a South polarity within the port locator 600 is attracted to a magnet with a North polarity within the tissue expander 100. The attraction between the magnets of the port locator 600 and the magnets of the tissue expander 100 causes the port locator 600 to sit at or otherwise be fixed at a specific location on the exterior surface of the patients tissue such that the fill port and the drain port of the tissue expander 100 effectively align 804 with locator apertures of the port locator 600. As previously discussed, the locator apertures may be structurally hollow (e.g., have open cylindrical shapes) with openings that allow a delivery apparatus (e.g., a syringe and needle combo) access to the fill and drain ports of the tissue expander 100. At block 806 of FIG. 8, the practitioner may percutaneously access, through the locator apertures, the fill port and/or the drain port of the tissue expander 100 to administer and/or extract fluid as the case may be.

Other Embodiments

In some implementations, the tissue expander 100 may be designed to have a magnet housing assembly 102' configured to hold a single magnet. Such a configuration, for example, may have the magnet housing assembly 102' placed between the fill and drain ports 104' and 106' as shown in the top sectional view of FIG. 9.

Figure 9:
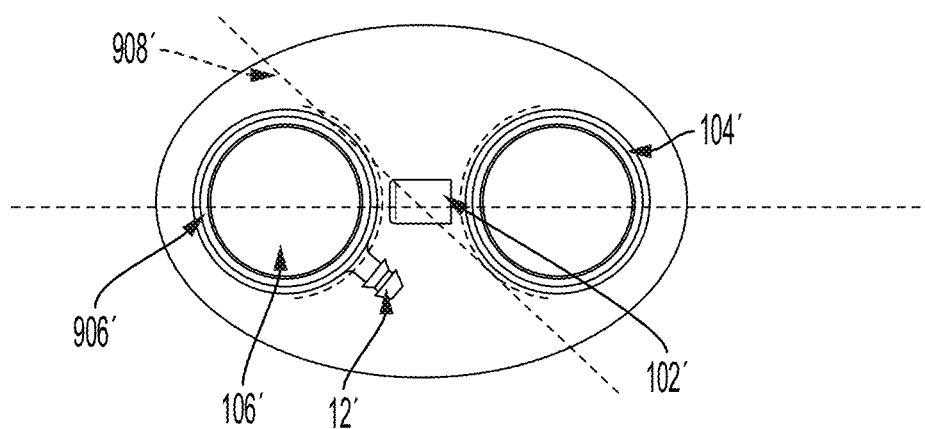
FIG. 9 shows an embodiment of the magnet housing assembly being aligned on a horizontal axis relative to the fill and drain ports of the tissue expander.

While the example of FIG. 9 shows the magnet housing assembly 102' being designed to horizontally hold or allow placement of the single magnet along a horizontal axis 906' parallel to the fill and drain ports 104' and 106', respectively, it is herein contemplated that the magnet housing assembly 102' may be structured in a manner that allows for the single magnet to be placed at an angle or placed along an angular non-parallel axis 908' between the fill and drain ports 104' and 106', respectively. It is appreciated that the drain port 106' of FIG. 9, like the drain port 106 of FIG. 1 includes a tubing junction 12' which is coupled to the drain tubing of the tissue expander. In some instances, the magnet housing assembly 102' is fabricated near a top surface of the tissue expander to allow for a port locater to readily detect a magnetic orientation of the single magnet within the magnet housing assembly 102'. In such implementations, the fill and drain ports 104' and 106', respectively, may be located using the poles (e.g., north and south poles) or the magnetic field of the single magnet within the magnet housing assembly 102'. In other words the single magnet placed within the magnet housing 102' may project a magnetic field (such as the magnetic field 1000 of FIG. 10) over the fill and drain ports 104' and 106' which is readily detectable by a port locator to facilitate identifying the fill and drain ports 104' and 106', respectively. Thus, the magnet housing assembly 102' may be fitted to the port assembly of the tissue expander such that the single magnet within the magnet housing assembly 102' projects a magnetic field that is detectable on an exterior surface of the biological tissue of the patient using the tissue expander. In other embodiments, the magnet housing assembly 102' may allow the magnet to rotate and or translate in response to a strong external magnetic field, such as in an MRI machine, and subsequently return to its original position after leaving said magnetic field.

In implementations where unwanted magnetic or electromagnetic interactions between the tissue expander and other medical equipment (e.g., MRI machines, radiation treatment machines) is desired, the structure of FIG. 9 may allow the use of very small magnets within the magnet housing assembly 102' to achieve very low magnetic and/or electromagnetic interactions with sensitive external equipment (e.g., MRI machines, radiation treatment machines, etc.) and/or magnetic or electromagnetic interactions with sensitive internal equipment (e.g., pacemakers, etc.). According to one embodiment, the small magnet is effectively decoupled from the fill and drain ports 104' and 106', respectively. Due to the low magnetic field generated (e.g, magnetic field 1000 of FIG. 10) by the single magnet within the magnet housing assembly 102', a digital port locator may be better suited for detecting and/or analyzing the magnetic field of the single magnet within the magnet housing assembly 102'. For example, the digital port locator 600' of FIG. 11 may include one or more computing device processors with specialized software that is operable to: detect the magnetic field of the single magnet within the magnet housing assembly 102'; analyze said magnetic field; and determine the location of the fill and drain ports 104' and 106', respectively, based on the analysis. This process of fill and drain port identification using the digital port locator is outlined in steps 1202-1206 of FIG. 12. It is appreciated that the software of the digital port locator/finder 600' may be configured to adapt to various configurations or embodiments of the tissue expander. In particular, the digital port locator 600' may calibrate itself or otherwise determine an operating mode for the digital port locator 600' upon detection of the magnetic field of a magnet (e.g., a magnet within the magnet housing assembly 102' (FIG. 9)) or magnets (e.g., magnets within the magnet housing assembly 102 (FIG. 1A)) to optimally operate as needed. Such versatility of calibration (e.g., automatic calibration or manual calibration) allows usage of a single digital port locator across multiple embodiments of the tissue expander 100. \ Moreover, the digital port locator may include a display device 1100 (e.g., display screen, touch screen, etc.) that provides one or more indications of where the fill and drain ports of the tissue expander are located in response to detecting the magnetic field of the magnet within the magnet housing assembly of the tissue expander.

According to some implementations, the magnet housing assembly 102' is structured to secure the magnet therein in place, thereby preventing the magnet from rotating due to external magnetic forces/fields from, for example, a port locator and/or an MRI machine. This structure of the magnet housing assembly 102' can maintain or otherwise cause the magnet within the magnet housing assembly 102' to rebound to a desired orientation when external magnetic torques from the port locator or an MRI machine, for example, are applied to the magnet within the magnet housing assembly 102'.

Figure 13A:
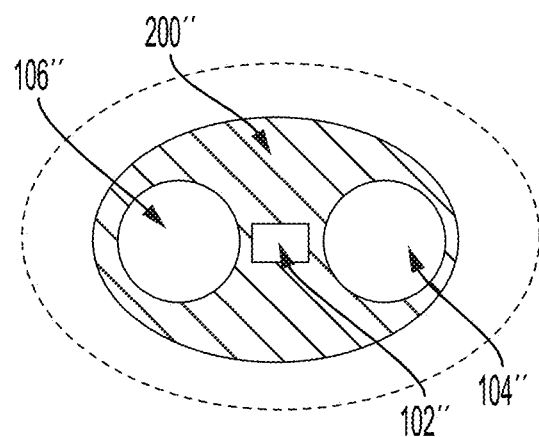
FIGS. 13A and 13B show an embodiment of the tissue expander having a single skirt/port assembly.

FIG. 13A shows an embodiment of the tissue expander 100 having a single skirt/port assembly 200". In such embodiments, the fill and drain ports 104" and 106" are directly built-into or otherwise embedded into the single skirt/port assembly 200". The magnet housing assembly 102" may have all the features discussed in association with the magnet housing assembly 102' of FIG. 9. In some cases, the magnet housing assembly 102" of FIG. 13 may be centrally located between the fill and drain ports 104" and 106" such that the magnet housing assembly 102" is equidistant or substantially equidistant relative to the fill and drain ports 104" and 106", respectively. According to some implementations, the fill and drain ports 104" and 106", respectively "go over" or are designed to be "on top" of the magnet housing assembly 102". In particular, the center axis 1300 of the single port assembly 200" may directly go over the magnet housing assembly 102" as shown in FIG. 13B.

Figure 13B:
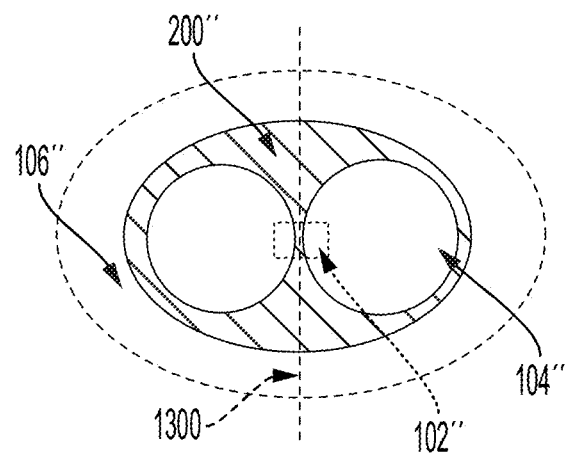

Some benefits to having the configuration of FIG. 13A or 13B is that the single port assembly 200" of the tissue expander 200 is cheaper to manufacture, and offers patients better comfort since the integration of the magnet housing assembly 102", the fill port 104", and the drain port 106" into the single port assembly 200" allows the tissue expander 100 to be less bulky. Moreover, the various embodiments of the tissue expander 100 discussed in this disclosure enable the use of magnets or single magnet (e.g., very small magnets or single magnet) that can refract radiation beams due to the configurations (e.g., FIGS. 9, 13A and 13B) of the tissue expander 100.

Magnetic Interactions

It should be noted that some users of the tissue expander 100 may undergo certain medical procedures involving equipment that may magnetically or electromagnetically interact with the magnet(s) placed in the tissue expander 100. For example, the magnet(s) described in association with the tissue expander 100 may interact with magnetic fields produced by a magnetic resonance imaging (MRI) device when a patient/user of the tissue expander 100 undergoes an MM procedure. Considering the MM example, it is appreciated that the features (e.g., magnet housing assemblies 102' or 102", single port assembly 200", small sized magnets or single magnet provided by this disclosure, etc.) allow the following additional benefits:

(i) the displacement force on the tissue expander 100 and/or the patient as the patient/user enters the bore of an MM machine is clinically acceptable;

(ii) the torque on the tissue expander 100 and the patient during and after entering the bore of the MRI machine is clinically acceptable;

(iii) the functionality, operation, or usage of the tissue expander 100 before and after an MRI procedure is maintained (e.g., the tissue expander is structurally unaffected, or its operation is unaffected by an MRI procedure.);

(iv) the magnetic field of the small magnets or magnet used in the tissue expander 100 is unaffected (neither does the magnets or magnet used in the tissue expander get demagnetized after an MRI procedure).

The tissue expander disclosed is robustly built to prevent magnets from demagnetizing due to temperature (heat) and a reverse external field. A magnet's ability to resist demagnetization may be associated with geometry (permeance coefficient), intrinsic coercivity Hci or Hcj and shape of intrinsic B-H curve. A longer and/or skinnier magnet may resist demagnetization more than a shorter thicker magnet. Considering the relationship between a patient using the tissue expander 100 and an MRI field direction, the magnet in the tissue expander 100, according to some embodiments, is designed to not experience a reverse external field high enough to demagnetize it. Moreover, the magnets or magnet disclosed herein are structured to resist demagnetization. According to some of the testing conducted using various embodiments of the tissue expander 100 discussed in this disclosure, the magnets or magnet used in the tissue expander 100 retain 99% of their strength after exposure to, for example, at least 3T (e.g., a 3 Tesla of magnetic resonance) in a fully reverse field (e.g., a reverse field caused by MM magnetic field).

According to some implementations, the magnets used in the tissue expander have the following additional benefits:

enough strength to facilitate port access via an analogue port locator (e.g., port locator port locator assembly 400);

enough magnetic strength to facilitate the use of an analogue port locator (e.g., port locator port locator assembly 400 and/or a digital port locator (e.g., digital port locator 600');

sufficient magnetic strength that is maintained before and after at least a 3T MRI exposure;

fit in a position in the tissue expander to facilitate port location and does not impact bulkiness or other desirable characteristics of the tissue expander 100.

According to one implementation, the magnets used in the tissue expander 100 include a 0.25" diameter×0.375" Neodymium Iron Boron length cylinder magnet of grade N32. Other exemplary magnet sizes include 0.25" diameter×0.25" length or 0.1875" diameter×0.375 length fabricated from Neodymium Iron Boron, or Samarium Cobalt, or other formulation that appropriately resists demagnetization influences such as heat and reverse magnetic fields Furthermore and as previously discussed, the magnet within the magnet housing assembly (e.g., magnet housing assemblies 102' and/or 102") may be positioned between and/or under the fill and drain ports of the tissue expander 100 such that the magnet placed within the magnet housing assembly projects a magnetic field out over the fill and drain ports of the tissue expander 100 and bends in a way that facilitates identification of the fill and drain ports using a port finder (e.g., port finder 600'). In some embodiments, the port finder or digital port locator includes software that calibrates the operation of the port finder based on one or more of the following:

the strength of the magnetic field projected by the magnet within the magnet housing assembly of the tissue expander 100, the geometry of the magnet within the magnet housing assembly, the orientation of the magnet within the magnet housing assembly, the polarity of the magnet within the magnet housing assembly.

According to some implementations, the magnet housing assembly protects a patient using the tissue expander 100 and/or an environment within which the tissue expander is stored from exposure to negative effects of magnets within the magnet housing assembly of the tissue expander 100. In some cases, the magnet housing assembly of the tissue expander 100 is hermetically sealed after a magnet is placed therein. Some embodiments of the magnet housing assembly include a coating within the magnet housing assembly using a biocompatible coating and/or a gold plating that mitigates against harmful effects of the magnet within the magnet housing assembly.

Turning back to FIGS. 13A and 13B, it is appreciated that the skirt/port assembly 200" may resist expansion of an upper expander shell of the tissue expander 100 when the tissue expander 100 is inflated or filled with fluid. This may desirably create a more anatomical breast shape and skin expansions around biological tissues into which the tissue expander is embedded. In some cases, the skirt/port assembly 200" may include a molded septum or septa that seals punctures (e.g., punctures made by a fluid delivery apparatus like a needle) when accessing the fill and drain ports of the tissue expander. In some implementations, the skirt/port assembly of the tissue expander 100 includes a bumper area (e.g., magnet housing assembly 102") that retains the magnet in a position that advantageously allows usage of an analogue and/or digital port finder/port locator.

Examples of Magnet Housing Assemblies

Figure 14A:
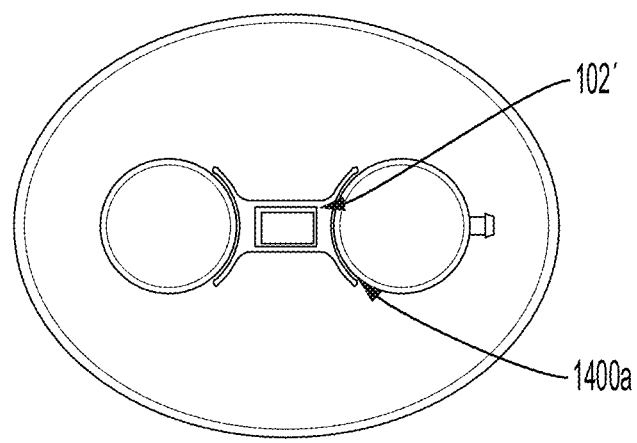
FIGS. 14A-17B show exemplary implementations of the magnet housing assembly of the tissue expander.
Figure 14B:
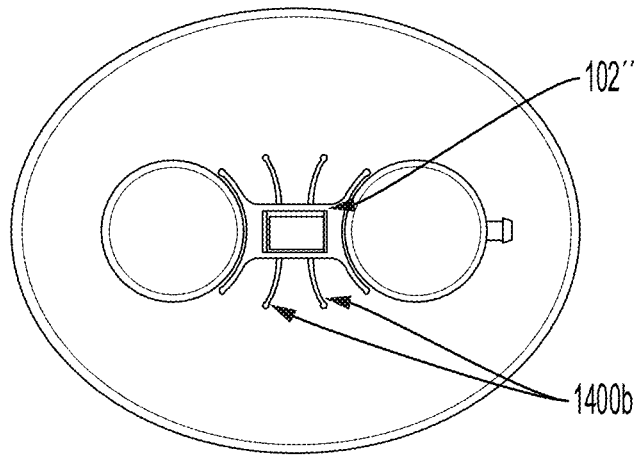
Figure 14C:
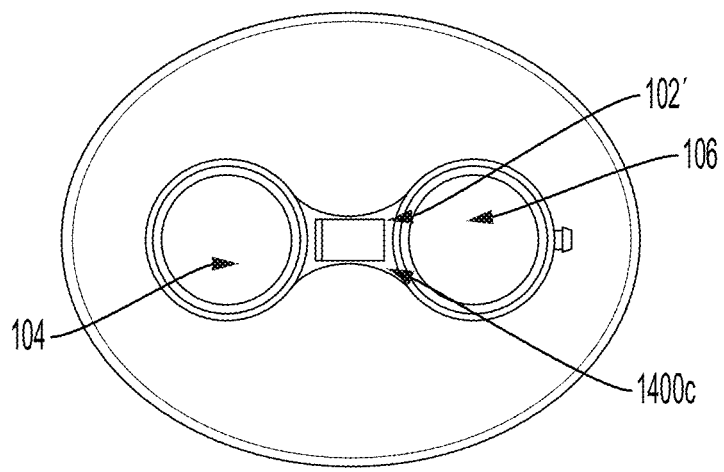

FIGS. 14A-17B show example implementations of the magnet housing assembly 201'. FIG. 14A shows a hybrid magnet housing assembly 102' designed to maximize its surface area against a silicone structure, for example, and thereby resist movement of a magnet housed therein. In some cases, the structure of the magnet housing assembly 102' of FIG. 14A includes a movement arm 1400a that may be translated from a center orientation while allowing a slight twist of the magnet housing assembly 102' during magnetic interactions with external magnet forces (e.g., from an MRI machine). According to some embodiments, such as that shown in FIG. 14B, the magnet housing assembly 102' may further include multiple arms 1400b that allow for greater resistance to torque (e.g., torque exerted by the magnet within the magnet housing assembly 102' due to external magnetic interactions). This resistance to torque by the magnet housing assembly 102' results from the magnet housing assembly 102' enveloping a larger surface area because of the arms 1400b, for example. In FIG. 14C, the magnet housing assembly 102' is structured within a housing (e.g., rigid housing) that surrounds the fill and drain ports 104 and 106, respectively. In particular, the structure of the magnet housing assembly 102' of FIG. 14C loops around the fill and drain ports 104 and 106 with the magnet housing assembly 102' being positioned at a center bridge 1400c. According to some embodiments, silicone may be used to fabricate or otherwise construct the magnet housing assembly 102'. It is appreciated that the structure of the magnet housing assembly 102' of FIG. 14C constrains a magnet housed within the magnet housing assembly 102' in a semi-flexible material (e.g., silicone, elastic material, etc.) that distributes the force of the housed magnet between the fill and drain ports 104 and 106, and the magnet housing assembly 102'.

Figure 14D:
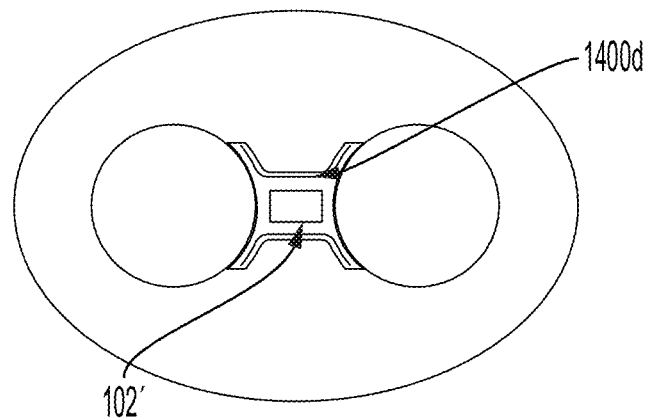

The magnet housing assembly 102' may comprise, for example, a brace structure 1400d attached to the magnet housing assembly 102' as shown in FIG. 14D. According to some embodiments, the brace structure 1400d may provide a maximized surface area for the magnet housing assembly 102' to resist movement of the magnet housing assembly 102' by having the magnet housing assembly 102' being press-fit into a silicone shape, for example, so as to dampen movement caused by torque on the magnet within the magnet housing assembly 102'. It is appreciated that the magnet housing assembly 102' may be constructed using PEEK materials and/or like polymers.

Figure 15A:
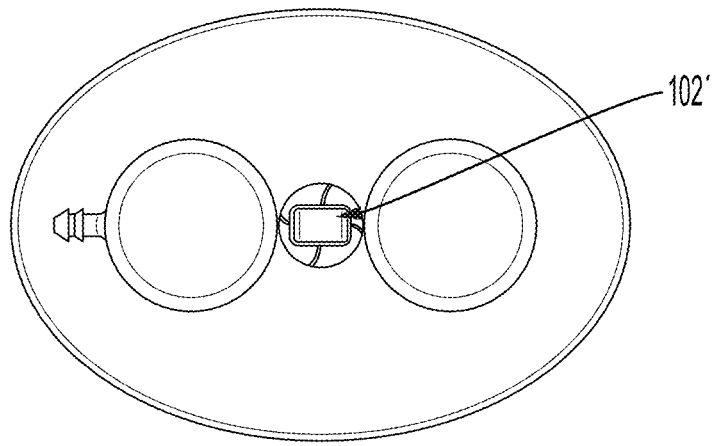
Figure 15B:
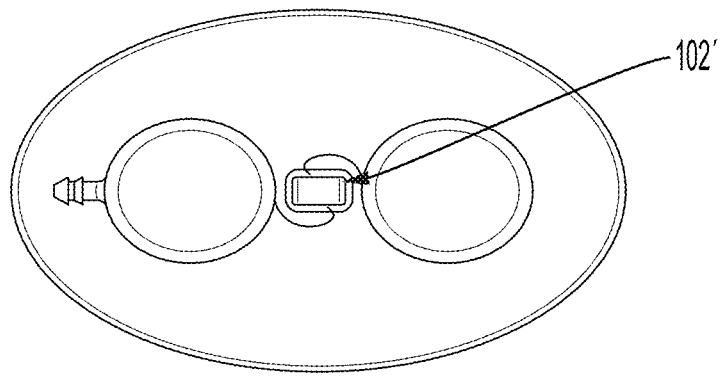

In the implementation shown in FIG. 15A, the magnet housing assembly 102' is structured to allow for slight rotations of the magnet contained therein due to, for example, interactions with an MM machine. Moreover, the dynamic structure of the magnetic housing assembly 102' of FIG. 15A allows a magnet within the magnet housing assembly 102' to spring back to a steady-state or normal position after said interactions with, for example, an MRI machine. In some instances, the structure of the magnet housing assembly 102' employs features that allow for greater rotational support of the magnet within the magnet housing assembly 102' as shown in FIG. 15B. This reduces the torque on the magnet within the magnet housing assembly 102' even with a greater angular rotation of the magnet housed in the magnet housing assembly 102'.

Figure 15C:
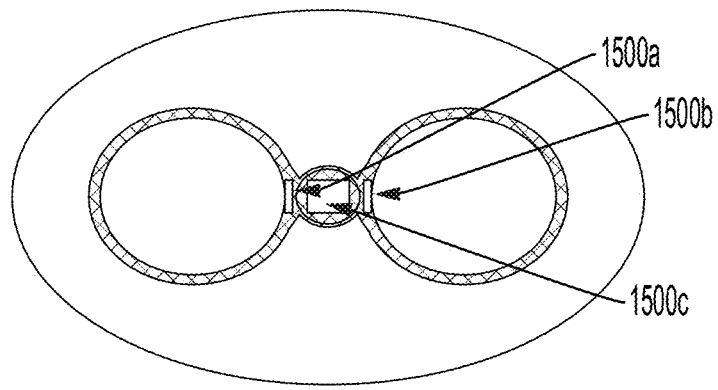

FIG. 15C shows an embodiment where the magnet within the magnet housing assembly is non-stationary at substantially all times. In some cases, the structure of FIG. 15C is similar to the structure of FIG. 14C with the difference being that in FIG. 15C, two magnets (e.g., two small disc magnets 1500a and 1500b) are positioned at or around the ends of the magnet. For example, one small magnet may be positioned at a first end of the magnet within the magnet housing assembly 102' and another small magnet may be positioned at a second end of the magnet housing assembly 102'. The two small magnets may realign the magnet (e.g., magnet 1500c) within the magnet housing assembly 102' back to its correct orientation once the tissue expander is removed from the influence of the external magnetic field (e.g., from an MRI machine).

Figure 15D:
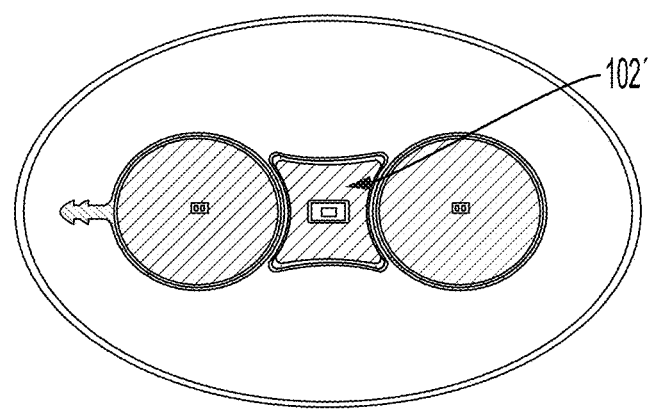
Figure 15E:
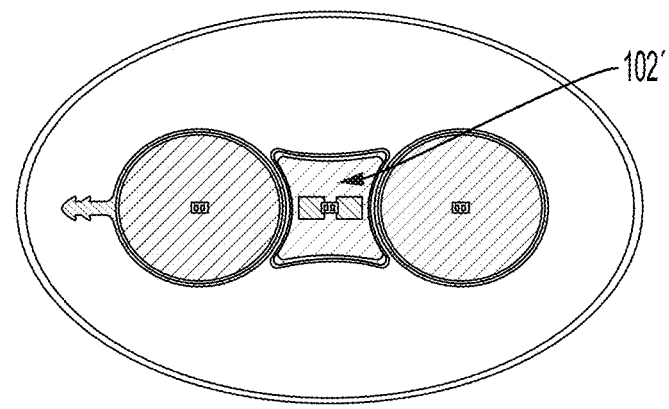

Embodiments of the magnet housing assembly 102' shown in FIGS. 15D and 15E employ small magnets. Exemplary small magnet sizes contemplated include 0.25" diameter×0.375" Neodymium Iron Boron length cylinder magnet of grade N32, or 0.25" diameter×0.25" length or 0.1875" diameter×0.375 length fabricated from Neodymium Iron Boron, or Samarium Cobalt, or other formulation that appropriately resists demagnetization influences such as heat and reverse magnetic fields. According to one implementation, the small magnets are structured to reduce the moment arm of the magnet within the magnet housing assembly 102' and the torque on said small magnet. Moreover, the structure shown in FIG. 15E shows two small magnets that receive a relatively small amount of torque while also maintaining a consistent magnetic field.

Figure 15F:
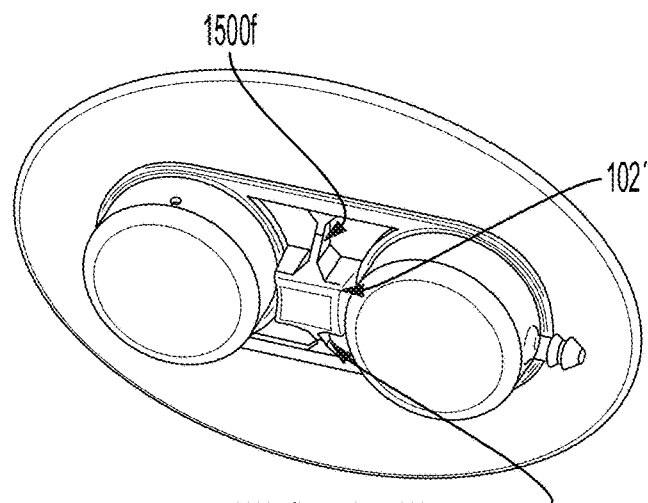

FIG. 15F shows an embodiment of the magnet housing assembly 102' that is designed or otherwise embedded within a bridge structure 1500f. The bridge structure 1500f may be made with a polyether ether ketone (PEEK) material or some other optimal-performance, engineering thermoplastic material that has elastic properties. According to one implementation, the structure shown in FIG. 15F may distribute force and/or weight acting on the skirt throughout multiple portions of the skirt of the tissue expander.

Figure 15G:
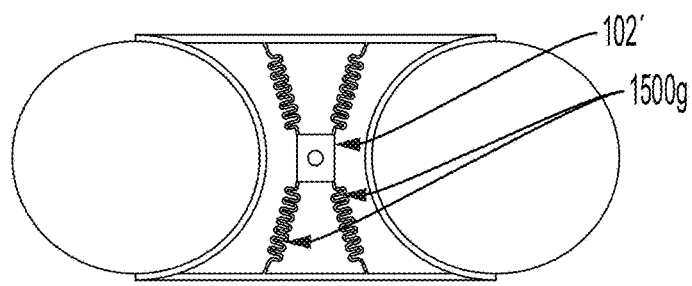

In FIG. 15G, the magnet housing assembly 102' is attached to a lattice spring structure 1500g that allows the magnet within the magnet housing assembly 102' to move freely between the fill and drain ports due to external driving forces (e.g., magnetic interactions from MRI machines). Minimal contact between the magnet housing assembly 102' and the fill and/or drain ports may be achieved with this structure.

Figure 15H:
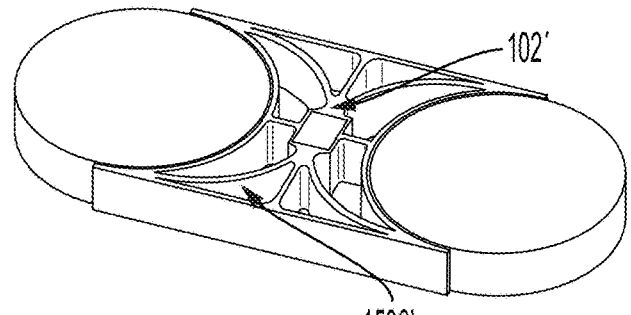

In the embodiment shown in FIG. 15H, the magnet housing assembly 102' is positioned in a web configuration 1500h that is structured to handle stresses on the skirt assembly and/or the fill and drain ports when the magnet within the magnet housing assembly 102' interacts with external magnetic fields. In some cases, the structure of FIG. 15H can cause the magnet within the magnet housing assembly 102' to rotate to a maximum degree of about 70 degrees when a significant amount of external torque is applied to the magnet in the magnet housing assembly 102'. In some cases, a smaller magnet is used in the configuration of FIG. 15H to allow for enough structure for the other components of the web structure 1500h to be included in the design.

Figure 16A:
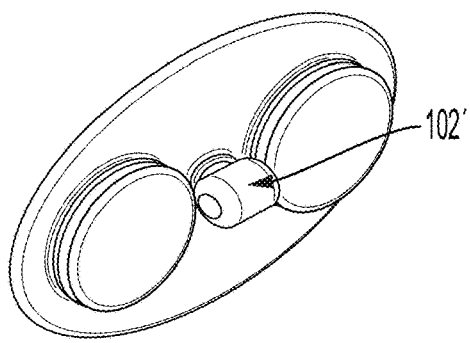

The peg rotation design of FIG. 16A contemplates that the magnet of the tissue expander may be slightly lifted above the skirt surface by using a peg (e.g., silicone peg). The silicone peg, for example may be affected by the torsion of the magnet within the magnet housing assembly 102' and may allow the magnet to spring back to its steady-state position after interactions with external magnetic forces (e.g., from an MRI machine).

Figure 16B:
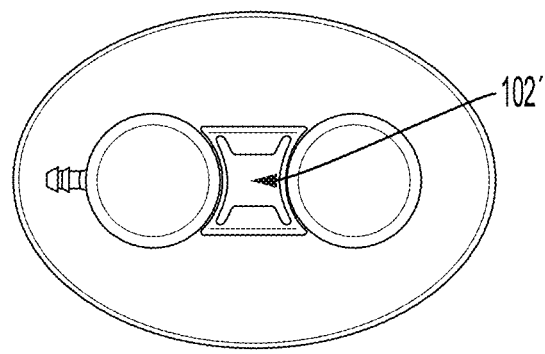

Shown in FIG. 16B is an encased PEEK bridge within which is fitted or otherwise embedded the magnet housing assembly 102'. This design uses one or more PEEK components that house the magnet such that the one or more PEEK components are further encased in a silicone mold. This design is not only easy to manufacture but is also easy to assemble. The use of an encased silicone part allows for the magnet within the magnet housing assembly 102' to move slightly by spreading its torsional force between at least the PEEK components and the silicone part.

According to some implementation, the magnet within the magnet housing assembly 102' may be retained within a surrounding geometry that may be flexible and allow the magnet within the magnet housing assembly 102' to rotate into alignment with an external magnetic field (e.g., from an MRI machine field). As the magnet aligns with the MRI field, for instance, the torque on the magnet may be reduced. When fully aligned, the torque on the magnet may be zero. The resulting torque on a user (e.g., patient) of the tissue expander may be equal to the torque required to displace a spring mechanism associated with the magnet housing assembly 102' from its initial position to a position where the magnet within the magnet housing assembly 102' stops rotating. In some cases, the magnet within the magnet housing assembly 102' may be retained in position by the surrounding geometry until an advantageous torque threshold is reached. The torque threshold at which the magnet rotates does not cause harm or discomfort to the user even though the said torque threshold may be significantly great. In some instances, the surrounding geometry around the magnet housing assembly 102' is thick walled, flexible and contains adjacent void space within which the magnet can rotate. For example, the geometry around the magnet housing assembly may be thick walled and the magnet therein may be spherical or rounded. The magnet may overcome friction in order to rotate and align with an MRI field. The geometry surrounding the magnet may be thick walled but soft and/or flexible enough to allow the magnet to rotate into alignment with an MM field, for example. In other embodiments, the geometry surrounding the magnet housing assembly 102' may be thin walled and flexible to facilitate rotation of the magnet therein. The geometry surrounding the magnet housing assembly 102' and/or a portion thereof may have bellow-like characteristics that allow a flexible material to deform with less restraining force upon magnet rotation in order to allow easier magnet rotation while retaining sufficient wall thickness for simplified manufacturing. In one implementation, the geometry surrounding the magnet housing assembly 102' advantageously allows for variable wall thickness that is flexible to allow the magnet to align with the MM field more easily after the initial torque threshold is surpassed.

Figure 17A:
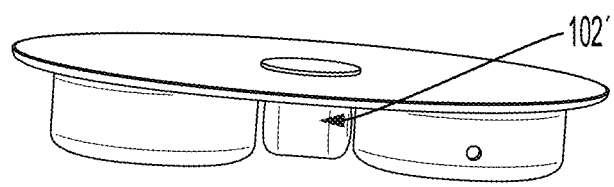
Figure 17B:
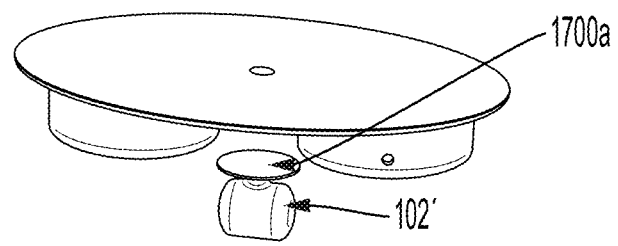

In other implementations, the magnet housing assembly 102' may be attached to a combination rotational spring and/or linear spring (e.g., combination rotational spring 1700a) as shown in FIGS. 17A and 17B. By attaching the magnet to a rotational and/or linear spring, the magnet can rotate to align with the magnetic field produced by the MM, for example. As the magnet aligns with an MRI field, for example, the torque on the magnet may be reduced. When fully aligned, the torque on the magnet is approximately zero. The resulting torque on the user may be equal to the torque required to displace the spring from its initial position to the position where the magnet stops rotating. The spring may be designed such that the maximum torque transferred to the user cannot cause harm or discomfort to the user. When the user exits the MRI field, the magnet within the magnet housing assembly rotates back into position, facilitating subsequent location of the ports using an analogue or digital port locator as previously discussed. In one embodiment, the magnet housing assembly 102' may be coupled or otherwise connected to a rubber (e.g., cylindrical rubber) or silicone spring. In some cases, the magnet housing assembly 102' may be connected to two or more silicone or rubber springs. In other embodiments the spring or springs may be plastic or a PEEK polymer.

Figure 18A:
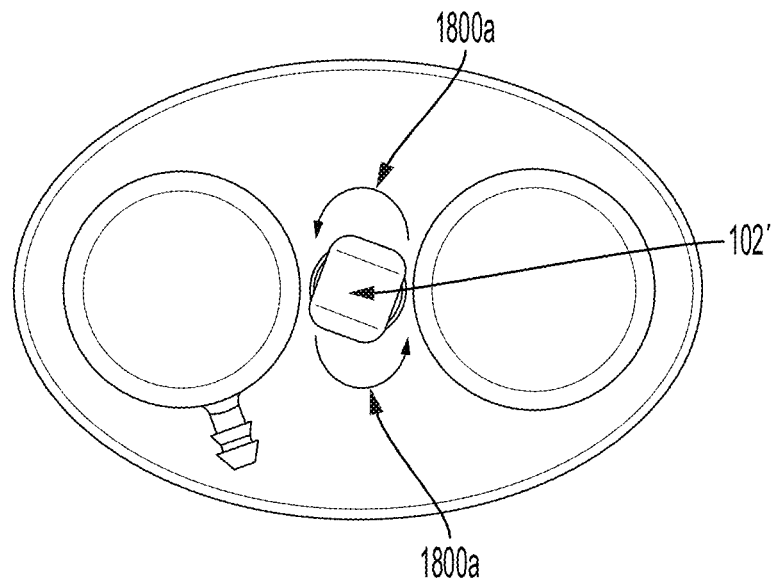
FIGS. 18A and 18B show the magnet housing assembly rotating in a first direction due to an external magnetic field and rotating in a second direction due to a steady state position after leaving the influence of the external magnetic field.
Figure 18B:
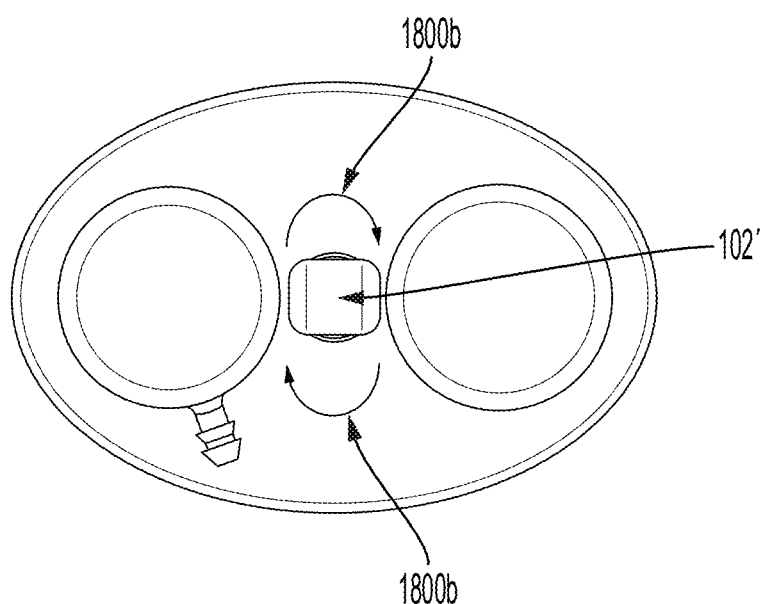
Figure 19:
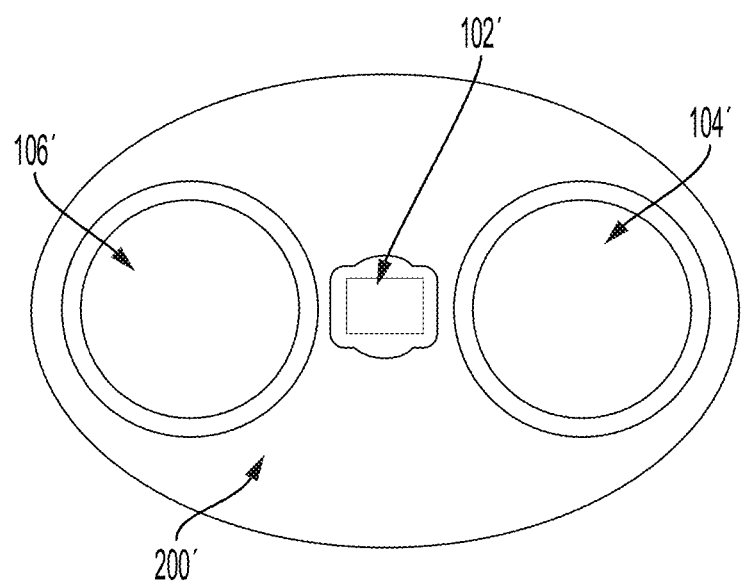
FIG. 19 shows an exemplary embodiment where the magnet housing assembly is fused into the skirt assembly.

The embodiment shown in FIGS. 18A and 18B shows the magnet housing assembly 102' rotating in a first direction 1800a due to an external magnetic field (e.g., from an MRI machine) and rotating back in a second direction 1800b to steady state position after leaving the influence of the external magnetic field. This may be achieved, for example, using the combination rotational and/or linear spring as previously discussed.

According to some implementations, the magnet within the magnet housing assembly 102' may be located in a recess feature surrounding geometry of the magnet housing assembly 102' that uses springs to return the magnet to its original position after interacting with an external magnetic field such as a field generated by an MRI machine. This structure may be similar, according to some embodiments, to the structure shown in FIG. 15G. In this embodiment, the magnet may be located within a recessed geometry of the magnet housing assembly 102' to which is attached one or more springs. The recessed geometry may have a semicircular, v-shaped, spiraled or other shapes including shapes with variable cross sections. As the user enters an external magnetic field such as an MRI field, the magnet displaces against the restraining forces provided by the one or more springs attached to the magnet housing assembly 102' and at the same time displacing from its original position within the recessed geometry. After being removed from the external magnetic field, the recessed geometry and spring force may guide the magnet back to its original position. It is appreciated that the magnet within the magnet housing assembly 102' may be disc-shaped, cylindrically shaped, elliptically shaped, spherically shaped, spheroidally shaped, or assume other geometrical shapes other than those disclosed herein.

Similar to embodiments shown in FIGS. 9, 13A and 13B, FIG. 19 shows an exemplary embodiment where the magnet housing assembly 102' is placed between, or otherwise fused into the skirt assembly 200' between the fill port 104' and drain port 106'. Fusing the magnet housing assembly 102', the fill port 104', and the drain port 106' directly into the skirt assembly 200' may involve using wall thicknesses for the various components fused or embedded into the skirt assembly 200' to ensure optimal performance of the tissue expander under various magnetic and/or electromagnetic conditions. For example, wall thicknesses of the magnetic housing assembly 102' may range from 1.25 mm to 2.75 mm with a resolution of about 0.5 mm. In other words the wall thickness discussed in association with FIG. 19 may include wall thicknesses of about 1.25 mm, or about 1.75 mm, or about 2.25 mm, or about 2.75 mm, according to some embodiments. Moreover, the wall thicknesses provided for the magnet housing assembly 102', for example, may allow for a greater resistance to rotation (e.g., 30 degree rotation, 45 degree rotation, 90 degree rotation, etc.) of the magnet within the magnet housing assembly thus keeping said magnet from excessively rotating within the magnet housing assembly 102' due to interactions from external magnet fields (e.g., magnetic fields from an MRI machine). Furthermore, the magnet within the magnet housing assembly 102', according to some implementations, may be snugly secured within the magnet housing assembly 102' to further restrict or otherwise prevent the magnet from excessively rotating or moving within the magnet housing assembly 102'. In some embodiments, the magnet housing assembly 102' includes a pocket that allows the magnet therein to rotate or otherwise jump from 0 degrees to 90 degrees when under the influence of an external magnetic field. When the tissue expander is removed from the influence of the external magnetic field, the magnet within the magnet housing assembly 102' then returns to its original position. In some cases, a seal is provided to seal the magnet within the magnet housing assembly 102'.

Figure 20:
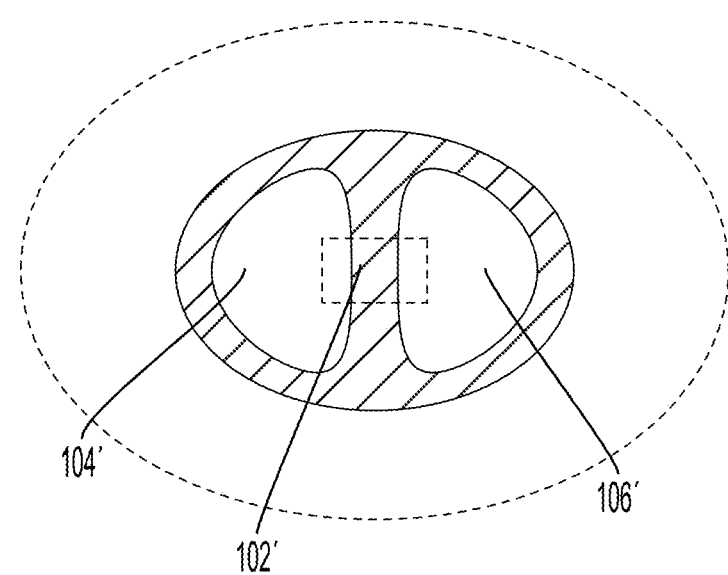
FIG. 20 shows an exemplary single port assembly that includes both a fill port and a drain port of the tissue expander.

FIG. 20 shows an exemplary single port assembly that includes both a fill port 104' and a drain port 106' of the tissue expander. In this embodiment, a magnet housing assembly 102' may be fashioned into the single port assembly between the fill port 104' and drain port 106'. While the fill port 104' and drain port 106' are shown as being horizontally arranged along the tissue expander, it is contemplated that these ports may be arranged in a vertical fashion. This magnet housing assembly may be positioned around a top surface of the single port assembly above the fill port 104' and the drain port 106' or below a bottom surface of the single port assembly below the fill port 104' and the drain port 106'. According to one embodiment, the single magnet housed within the magnet housing assembly 102' may be oriented, for example, in an east-west orientation between the fill port 104' and the drain port 106' such that each pole of the single magnet faces one of the fill port 104' and the drain port 106' as shown. This configuration beneficially allows for detection of the fill port 104' and drain port 106' at deeper depths under the biological tissue of a user of the tissue expander. Moreover, this design may be implemented using very small amounts of metal since it relies on the use of a small single magnet, such as the small magnets discussed above. Some advantages of this implementation is that tissue expanders that are compact, MRI therapy-safe, and/or radiation therapy-safe may be fabricated and used based on the techniques and structures provided by this disclosure. In addition, a single port finder, such as the digital port finder discussed above, or a modified analogue port finder requiring a single magnet may be used to seamlessly locate the fill port 104' and the drain port 106' of the single port assembly shown in FIG. 20.

The above description has been provided with reference to specific embodiments. However, the illustrative discussions above are not intended to be exhaustive; neither do they limit this disclosure to the precise forms presented. Many modifications and variations are possible in view of the above teachings. The embodiments were chosen and described in order to explain the principles of the present disclosure and its practical applications, to thereby enable others skilled in the art to utilize the principles described and various embodiments with various modifications as suited to the particular use contemplated.

What is claimed is:

1. A tissue expander comprising:
a port assembly including a first port and a second port;
a magnet housing assembly fitted to the port assembly, wherein the magnet housing assembly includes a magnet having a magnetic field that is detectable on an exterior surface of biological tissue of a patient, and the magnet housing assembly is at least partially made of a semi-flexible material and configured to allow the magnet to move or rotate during a magnetic interaction with an external magnetic field;
a shell defining an interior cavity of the tissue expander and having an exterior surface; and
a drain assembly in fluidic communication with the first port via a drain tubing, wherein the drain assembly includes a drain manifold integrated into the shell, and the drain manifold is coupled to a drain hole component attached to the drain tubing.

2. The tissue expander of claim 1, wherein:
the first port comprises a drain port coupled to the drain tubing such that the drain tubing channels fluid to and from the drain port; and
the second port comprises a fill port such that the fill port channels fluid into the interior cavity of the shell to cause the tissue expander to enlarge.

3. The tissue expander of claim 1, further comprising a plurality of suture tabs configured to secure the tissue expander in place, the plurality of suture tabs being positioned to have a lengthwise centerline that is perpendicular to a base perimeter tangent of the shell.

4. The tissue expander of claim 1, further comprising at least one of:
a hybrid magnet housing assembly,
a brace structure attached to the magnet housing assembly,
a housing that surrounds the first port and the second port,
one or more spring mechanisms attached to the magnet housing assembly,
a rotational or linear spring attached to the magnet housing assembly, or
a bridge structure within which is embedded the magnet housing assembly.

5. The tissue expander of claim 1, wherein the magnet housing assembly is between the first port and the second port.

6. The tissue expander of claim 1, wherein the magnet is a single magnet, and the single magnet is decoupled from the first port and the second port.

7. The tissue expander of claim 1, wherein the magnet is a single magnet, and the magnetic field of the single magnet projects over the first port and the second port for detection by a port locator.

8. The tissue expander of claim 7, wherein the port locator is a digital port locator or an analogue port locator.

9. The tissue expander of claim 8, wherein the digital port locator is configured to execute software that calibrates operation of the digital port locator based on at least one of:
a strength of the magnetic field,
a geometry of the single-magnet within the magnet housing assembly,
an orientation of the single-magnet within the magnet housing assembly, or
a polarity of the single-magnet within the magnet housing assembly.

10. The tissue expander of claim 1, further comprising a skirt assembly that resists expansion of an upper part of the shell of the tissue expander when the tissue expander is inflated or filled with fluid.

11. The tissue expander of claim 10, wherein the skirt assembly includes a molded septum that seals a puncture made by a fluid delivery apparatus.

12. The tissue expander of claim 10, wherein the magnet housing assembly has a web structure to handle stresses on one or more of the skirt assembly, the first port, and the second port when the magnet interacts with the external magnetic field.

13. The tissue expander of claim 1, wherein the magnet is a single magnet, and the single magnet retains substantially 99% of the magnetic field after exposure to a reverse magnetic field.

14. The tissue expander of claim 1, wherein the magnet is a single magnet, and the single magnet has a cylindrical shape.

15. The tissue expander of claim 1, wherein the exterior surface of the shell is surrounded by biological tissue of the patient when the tissue expander is inserted in the patient.

16. The tissue expander of claim 15, wherein the drain assembly provides the first port with fluid access to seroma fluid that includes dead skin of the patient around the exterior surface of the shell when the tissue expander is inserted in the patient.

17. The tissue expander of claim 2, wherein enlargement of the tissue expander causes the biological tissue of the patient surrounding the tissue expander to expand when the tissue expander is inserted in the patient.

18. The tissue expander of claim 1, wherein the magnet housing assembly comprises a movement arm configured to be translated from a center orientation.

19. The tissue expander of claim 18, wherein the movement arm is configured to allow a slight twisting of the magnet housing assembly during the magnetic interaction with the external magnet force.

20. The tissue expander of claim 18, wherein the magnet housing assembly comprises a center bridge, and the movement arm extends from the center bridge.

21. The tissue expander of claim 20, wherein the magnet housing assembly comprises a second movement arm extending from the center bridge.

22. The tissue expander of claim 20, wherein the center bridge extends between the first port and the second port.

23. The tissue expander of claim 18, wherein the movement arm extends at least partially around one of the first port and the second port.

24. The tissue expander of claim 18, wherein the magnet housing assembly is configured to return the magnet to an original orientation in an absence of the external magnetic field.

25. The tissue expander of claim 1, wherein the semi-flexible material comprises silicone.

26. The tissue expander of claim 1, wherein the magnet housing assembly is configured to spring back to an original position in an absence of the external magnetic field.

27. The tissue expander of claim 26, wherein the magnet housing assembly is attached to a rotational spring and/or a linear spring.

28. A system comprising:
- a tissue expander comprising:
  - a port assembly including a first port and a second port,
  - a magnet housing assembly fitted to the port assembly, wherein the magnet housing assembly includes a magnet having a magnetic field that is detectable on an exterior surface of biological tissue of a patient, and the magnet housing assembly is at least partially made of a semi-flexible material and configured to allow the magnet to move or rotate during a magnetic interaction with an external magnetic field,
  - a shell defining an interior cavity of the tissue expander and having an exterior surface, and
  - a drain assembly in fluidic communication with the first port via a drain tubing, wherein the drain assembly includes a drain manifold integrated into the shell, and the drain manifold is coupled to a drain hole component attached to the drain tubing; and
- a port locator configured to interact with the magnet to locate the first port and the second port.

* * * * *